United States Patent
Zhou et al.

(10) Patent No.: US 11,290,388 B2
(45) Date of Patent: Mar. 29, 2022

(54) FLOW CONTROL METHOD AND APPARATUS

(71) Applicant: HUAWEI TECHNOLOGIES CO., LTD., Guangdong (CN)

(72) Inventors: Hong Zhou, Nanjing (CN); Yun Xiong, Nanjing (CN); Xing Xing, Shenzhen (CN); Xiang Yu, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/021,478

(22) Filed: Sep. 15, 2020

(65) Prior Publication Data

US 2021/0006502 A1 Jan. 7, 2021

Related U.S. Application Data

(63) Continuation of application No. PCT/CN2020/071537, filed on Jan. 10, 2020.

(30) Foreign Application Priority Data

Feb. 2, 2019 (CN) .......................... 201910107858.0

(51) Int. Cl.
*G06F 15/16* (2006.01)
*H04L 47/62* (2022.01)
(Continued)

(52) U.S. Cl.
CPC ........ *H04L 47/6215* (2013.01); *H04L 12/465* (2013.01); *H04L 47/12* (2013.01); *H04L 47/805* (2013.01)

(58) Field of Classification Search
CPC ... H04L 47/6215; H04L 47/12; H04L 47/805; H04L 47/6275; H04L 47/10; H04L 47/2408
See application file for complete search history.

(56) References Cited

U.S. PATENT DOCUMENTS

| 7,533,154 B1* | 5/2009 | Chen ................... H04L 47/6215 709/213 |
| 2012/0250511 A1* | 10/2012 | Neeser .................. H04L 47/24 370/235 |
| 2017/0339075 A1* | 11/2017 | Arad .................. H04L 49/9084 |

FOREIGN PATENT DOCUMENTS

| CN | 101505260 A | 8/2009 |
| CN | 103888379 A | 6/2014 |

(Continued)

OTHER PUBLICATIONS

Yuanwei Lu et al.,"One More Queue is Enough: Minimizing Flow Completion Time with Explicit Priority Notification", IEEE INFOCOM 2017—IEEE Conference on Computer Communications, IEEE, May 1, 2017, total 10 pages.

(Continued)

*Primary Examiner* — Hieu T Hoang
(74) *Attorney, Agent, or Firm* — Womble Bond Dickinson (US) LLP

(57) ABSTRACT

Embodiments of this application relate to the field of communications technologies, and disclose a flow control method and apparatus, to resolve a prior-art problem such as packet loss, packet accumulation, or network congestion that occurs after a packet is switched between priority queues. A specific solution is as follows: A first device receives a first packet sent by a second device, where the first packet carries a first field and a second field, the first field carries a first priority, and the second field carries a second priority; the first device performs flow control based on the first priority in the first packet; and the first device performs queue scheduling on the first packet based on the second priority in the first packet.

20 Claims, 17 Drawing Sheets

(51) Int. Cl.
*H04L 12/46* (2006.01)
*H04L 47/12* (2022.01)
*H04L 47/80* (2022.01)

(56) References Cited

FOREIGN PATENT DOCUMENTS

| | | | |
|---|---|---|---|
| CN | 104092622 A | | 10/2014 |
| CN | 108234343 A | | 6/2018 |
| EP | 1978699 A1 | | 10/2008 |
| WO | WO-2016086385 A1 | * | 6/2016 |

OTHER PUBLICATIONS

IEEE Std 802.1Qbb™—2011, Media Access Control (MAC) Bridges and Virtual Bridged Local Area Networks—Amendment 17: Priority-based Flow Control, Sep. 30, 2011, total 40 pages.

* cited by examiner

FLOW CONTROL METHOD AND APPARATUS

CROSS-REFERENCE TO RELATED APPLICATIONS

This application is a continuation of International Application No. PCT/CN2020/071537, filed on Jan. 10, 2020, which claims priority to Chinese Patent Application No. 201910107858.0, filed on Feb. 2, 2019. The disclosures of the aforementioned applications are hereby incorporated by reference in their entireties.

TECHNICAL FIELD

Embodiments of this application relate to the field of communications technologies, and in particular, to a flow control method and apparatus.

BACKGROUND

Currently, more services require zero packet loss. An existing method is to implement link-level flow control by using a flow control technology (for example, priority-based flow control (PFC)), to avoid network packet loss.

However, when a network deadlock occurs due to loop dependency of a priority queue, or when network congestion occurs because a plurality of data flows from a plurality of switches are transmitted to a same server, to resolve the network deadlock or network congestion, a packet is usually switched between priority queues. As shown in FIG. 1, in a processing procedure on an egress side, a switch 1 switches a packet in a priority queue 1 at an egress of the switch 1 to a priority queue 2 on a switch 2. If a flow control technology is priority-based flow control (PFC), and the switch 2 determines that congestion occurs in the priority queue 2 on the switch 2 and a PFC OFF threshold is reached, the switch 2 sends PFC backpressure information to the switch 1. The PFC backpressure information requires that a packet in a priority queue 2 on the switch 1 stops being sent to the switch 2. Because a packet in a flow 1 is actually stored in the priority queue 1 on the switch 1, after receiving the Pause, the switch 1 does not stop sending the packet in the flow 1. This causes packet loss at an ingress of the switch 2. Therefore, after the packet is switched between the priority queues, packet loss still occurs in the existing flow control method.

If the flow control technology is credit-based flow control, the switch 2 determines, based on available space of a buffer on the switch 2, a credit value corresponding to the priority queue 2, and sends a credit allocation message to the switch 1. The credit allocation message carries a priority identifier 2 and a credit value corresponding to the priority identifier 2. Because the credit value in the credit allocation message is actually an available credit value for the priority queue 1 on the switch 1, but is sent for the priority queue 2 on the switch 1, the credit value for the priority queue 1 on the switch 1 is not received. Consequently, packets in the priority queue 1 on the switch 1 are accumulated, and a packet in the priority queue 2 on the switch 1 is incorrectly sent based on the credit value. This may cause network congestion.

SUMMARY

Embodiments of this application provide a flow control method and apparatus, to avoid packet loss, packet accumulation, network congestion, or the like that occurs after a packet is switched between priority queues.

To achieve the foregoing objective, the following technical solutions are used in the embodiments of this application.

According to a first aspect of the embodiments of this application, a flow control method is provided. The method includes: receiving, by a first device, a first packet sent by a second device, where the first packet carries a first field and a second field, the first field carries a first priority, and the second field carries a second priority; performing, by the first device, flow control based on the first priority in the first packet; and performing, by the first device, queue scheduling on the first packet based on the second priority in the first packet. Based on this solution, a packet carries two priorities. One priority is used for flow control, and the other priority is used for queue scheduling. Therefore, after the packet is switched between priority queues, accurate flow control information can be sent to an upstream device, to avoid packet loss, packet accumulation, network congestion, or the like.

In one embodiment, the performing, by the first device, flow control based on the first priority in the first packet includes: sending, by the first device, flow control information to the second device based on the first priority in the first packet. The flow control information carries the first priority, and the flow control information is used to indicate the second device to perform flow control based on the flow control information. Based on this solution, when switching is performed between priority queues, accurate flow control information can be sent to an upstream device based on the first priority in the first packet, to perform flow control.

In one embodiment, the method further includes: resetting, by the first device, a value of the first priority in the first packet to a value of the second priority in the first packet. Based on this solution, the value of the first priority in the first packet is reset to the value of the second priority in the first packet, so that when congestion occurs on a downstream device of the first device, accurate flow control information can be sent to the first device based on the reset value of the first priority, to perform flow control.

In one embodiment, the method further includes: resetting, by the first device, the value of the second priority in the first packet to a value different from the value of the second priority. Based on this solution, after the first packet is switched between priority queues, the value of the second priority in the first packet can be reset, to ensure that the first packet is enqueued into a correct priority queue on a downstream device.

In one embodiment, the method further includes: sending, by the first device, the first packet to a third device. Based on this solution, the first packet with the first priority whose value is reset or the first packet with the first priority and second priority whose values are both reset is sent to the third device, so that the third device can also perform correct flow control based on the two priorities in the first packet, to avoid packet loss, packet accumulation, network congestion, or the like.

In one embodiment, if the first packet is an internet protocol IP data packet, the first field is a precedence field, and the second field is a delay throughput reliability DTR field; or the first field is a delay throughput reliability DTR field, and the second field is a precedence field. Based on this solution, two priorities can be carried in the IP packet.

In one embodiment, if the first packet is an Ethernet data packet, the first field is a priority PRI field in a first virtual local area network tag VLAN tag, and the second field is a priority PRI field in a second virtual local area network tag VLAN tag. Based on this solution, two priorities can be carried in the Ethernet data packet.

According to a second aspect of the embodiments of this application, a flow control method is provided. The method includes: receiving, by a first device, a first packet sent by a second device, where the first packet carries a first field, and the first field carries a first priority; receiving, by the first device, a mapping table sent by a controller, where the mapping table includes a correspondence between identification information of a packet and a second priority; looking up, by the first device, the mapping table to determine a second priority corresponding to the first packet; performing, by the first device, flow control based on the first priority in the first packet; and performing, by the first device, queue scheduling on the first packet based on the second priority corresponding to the first packet. Based on this solution, the first priority is carried in the packet, and the second priority is obtained from the mapping table sent by the controller. The first priority is used for flow control, and the second priority is used for queue scheduling. Therefore, after the packet is switched between priority queues, accurate flow control information can be sent to an upstream device, to avoid packet loss, packet accumulation, network congestion, or the like.

In one embodiment, the performing, by the first device, flow control based on the first priority in the first packet includes: sending, by the first device, flow control information to the second device based on the first priority in the first packet. The flow control information carries the first priority, and the flow control information is used to indicate the second device to perform flow control based on the flow control information. Based on this solution, when switching is performed between priority queues, accurate flow control information can be sent to an upstream device based on the first priority in the first packet, to perform flow control.

In one embodiment, the method further includes: resetting, by the first device, a value of the first priority in the first packet to a value of the second priority corresponding to the first packet. Based on this solution, the value of the first priority in the first packet is reset to the value of the second priority corresponding to the first packet, so that when congestion occurs on a downstream device of the first device, accurate flow control information can be sent to the first device based on the reset value of the first priority, to perform flow control.

In one embodiment, the method further includes: sending, by the first device, the first packet to a third device. Based on this solution, the first packet with the first priority whose value is reset is sent to the third device, so that the third device can also perform correct flow control based on the two priorities corresponding to the first packet, to avoid packet loss, packet accumulation, network congestion, or the like.

In one embodiment, a flow control apparatus is provided. The apparatus includes: a transceiver module, configured to receive a first packet sent by a second device, where the first packet carries a first field and a second field, the first field carries a first priority, and the second field carries a second priority; and a processing module, configured to perform flow control based on the first priority in the first packet; where the processing module is further configured to perform queue scheduling on the first packet based on the second priority in the first packet.

In one embodiment, the processing module is specifically configured to send flow control information to the second device based on the first priority in the first packet through the transceiver module. The flow control information carries the first priority, and the flow control information is used to indicate the second device to perform flow control based on the flow control information.

In one embodiment, the processing module is further configured to reset a value of the first priority in the first packet to a value of the second priority in the first packet.

In one embodiment, the processing module is further configured to reset the value of the second priority in the first packet to a value different from the value of the second priority.

In one embodiment, the transceiver module is further configured to send the first packet to a third device.

In one embodiment, if the first packet is an internet protocol IP data packet, the first field is a precedence field, and the second field is a delay throughput reliability DTR field; or the first field is a delay throughput reliability DTR field, and the second field is a precedence field.

In one embodiment, if the first packet is an Ethernet data packet, the first field is a priority PRI field in a first virtual local area network tag VLAN tag, and the second field is a priority PRI field in a second virtual local area network tag VLAN tag.

In one embodiment, a flow control apparatus is provided. The apparatus includes: a transceiver module, configured to receive a first packet sent by a second device, where the first packet carries a first field, and the first field carries a first priority; where the transceiver module is further configured to receive a mapping table sent by a controller, where the mapping table includes a correspondence between identification information of a packet and a second priority; and a processing module, configured to look up the mapping table to determine a second priority corresponding to the first packet; where the processing module is further configured to perform flow control based on the first priority in the first packet; and the processing module is further configured to perform queue scheduling on the first packet based on the second priority corresponding to the first packet.

In one embodiment, the processing module is specifically configured to send flow control information to the second device based on the first priority in the first packet through the transceiver module. The flow control information carries the first priority, and the flow control information is used to indicate the second device to perform flow control based on the flow control information.

In one embodiment, the processing module is further configured to reset a value of the first priority in the first packet to a value of the second priority corresponding to the first packet.

In one embodiment, the transceiver module is further configured to send the first packet to a third device.

In one embodiment, a flow control apparatus is provided. The apparatus includes: a transceiver, configured to receive a first packet sent by a second device, where the first packet carries a first field and a second field, the first field carries a first priority, and the second field carries a second priority; and a processor, configured to perform flow control based on the first priority in the first packet; where the processor is further configured to perform queue scheduling on the first packet based on the second priority in the first packet.

In one embodiment, the processor is specifically configured to send flow control information to the second device based on the first priority in the first packet through the transceiver. The flow control information carries the first priority, and the flow control information is used to indicate the second device to perform flow control based on the flow control information.

In one embodiment, the processor is further configured to reset a value of the first priority in the first packet to a value of the second priority in the first packet.

In one embodiment, the processor is further configured to reset the value of the second priority in the first packet to a value different from the value of the second priority.

In one embodiment, the transceiver is further configured to send the first packet to a third device.

In one embodiment, if the first packet is an internet protocol IP data packet, the first field is a precedence field, and the second field is a delay throughput reliability DTR field; or the first field is a delay throughput reliability DTR field, and the second field is a precedence field.

In one embodiment, if the first packet is an Ethernet data packet, the first field is a priority PRI field in a first virtual local area network tag VLAN tag, and the second field is a priority PRI field in a second virtual local area network tag VLAN tag.

In one embodiment, a flow control apparatus is provided. The apparatus includes: a transceiver, configured to receive a first packet sent by a second device, where the first packet carries a first field, and the first field carries a first priority; where the transceiver is further configured to receive a mapping table sent by a controller, where the mapping table includes a correspondence between identification information of a packet and a second priority; and a processor, configured to look up the mapping table to determine a second priority corresponding to the first packet; where the processor is further configured to perform flow control based on the first priority in the first packet; and the processor is further configured to perform queue scheduling on the first packet based on the second priority corresponding to the first packet.

In one embodiment, the processor is specifically configured to send flow control information to the second device based on the first priority in the first packet through the transceiver module. The flow control information carries the first priority, and the flow control information is used to indicate the second device to perform flow control based on the flow control information.

In one embodiment, the processor is further configured to reset a value of the first priority in the first packet to a value of the second priority corresponding to the first packet.

In one embodiment, the transceiver is further configured to send the first packet to a third device.

In one embodiment, the flow control information includes priority-based flow control PFC information. The PFC information is used to indicate a first port of the second device to perform, based on the first priority, flow control on a packet in a priority queue indicated by the first priority. Based on this solution, the PFC information can be sent to the first device based on the first priority in the first packet by using a PFC technology. Therefore, when switching is performed between priority queues, accurate PFC information can be sent to an upstream device, to perform flow control.

In one embodiment, the PFC information includes a PFC frame. The PFC frame is used to indicate the first port of the second device to temporarily stop sending, to the first device, the packet in the priority queue indicated by the first priority. Based on this solution, the PFC frame can be sent to the first device based on the first priority in the first packet. Therefore, when switching is performed between priority queues, an accurate PFC frame is sent to the upstream device, to indicate the first port of the second device to temporarily stop sending, to the first device, the packet in the priority queue indicated by the first priority.

In one embodiment, the PFC information includes a PFC frame. The PFC frame is used to indicate the first port of the second device to start to send, to the first device, the packet in the priority queue indicated by the first priority. Based on this solution, the PFC frame can be sent to the first device based on the first priority in the first packet. Therefore, when switching is performed between priority queues, an accurate PFC frame is sent to the upstream device, to indicate the first port of the second device to start to send, to the first device, the packet in the priority queue indicated by the first priority.

In one embodiment, the PFC frame further carries first duration. The first duration is used to indicate the first port of the second device to wait for the first duration after receiving the PFC frame, and start to send, to the first device, the packet in the priority queue indicated by the first priority. Based on this solution, after receiving the PFC frame, the first port of the second device can temporarily stop sending, to the first device, the packet in the priority queue indicated by the first priority, wait for the first duration, and start to send, to the first device, the packet in the priority queue indicated by the first priority.

In one embodiment, the flow control information includes credit-based flow control Credit information. The Credit information is used to indicate the second device to update, based on a first credit value corresponding to the first priority, a credit value corresponding to a priority queue indicated by the first priority. Based on this solution, the Credit information can be sent to the first device based on the first priority in the first packet by using a credit-based flow control technology. Therefore, when switching is performed between priority queues, accurate Credit information can be sent to an upstream device, to perform flow control.

In one embodiment, a computer storage medium is provided. The computer storage medium stores computer program code. When the computer program code is run on a processor, the processor is enabled to perform the flow control method according to any one of the foregoing aspects.

In one embodiment, a computer program product is provided. The program product stores a computer software instruction executed by the foregoing processor. The computer software instruction includes a program used to perform the solutions in the foregoing aspects.

In one embodiment, a flow control apparatus is provided. The apparatus includes a transceiver, a processor, and a memory. The transceiver is configured to send and receive information, or configured to communicate with another network element. The memory is configured to store a computer-executable instruction. The processor is configured to execute the computer-executable instruction to implement the flow control method according to any one of the foregoing aspects.

In one embodiment, a flow control apparatus is provided. The apparatus exists in a product form of a chip. A structure of the apparatus includes a processor and a memory. The memory is configured to be coupled to the processor, and store a program instruction and data that are necessary for the apparatus. The processor is configured to execute the program instruction stored in the memory, so that the apparatus performs functions of the apparatus in the foregoing method.

DESCRIPTION OF EMBODIMENTS

First, some terms in the embodiments of this application are described.

1. Priority-Based Flow Control (PFC)

Figure 1:
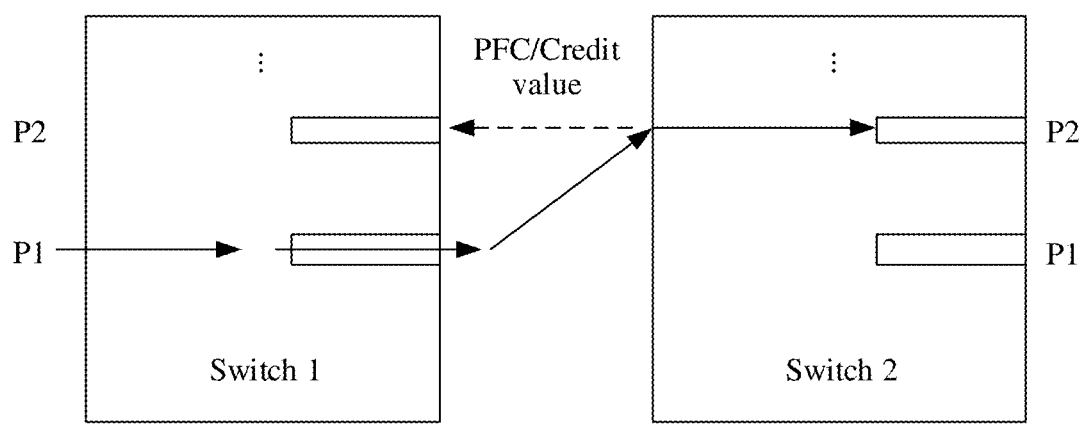
FIG. 1 is a schematic diagram of a flow control method in the prior art.
Figure 2:
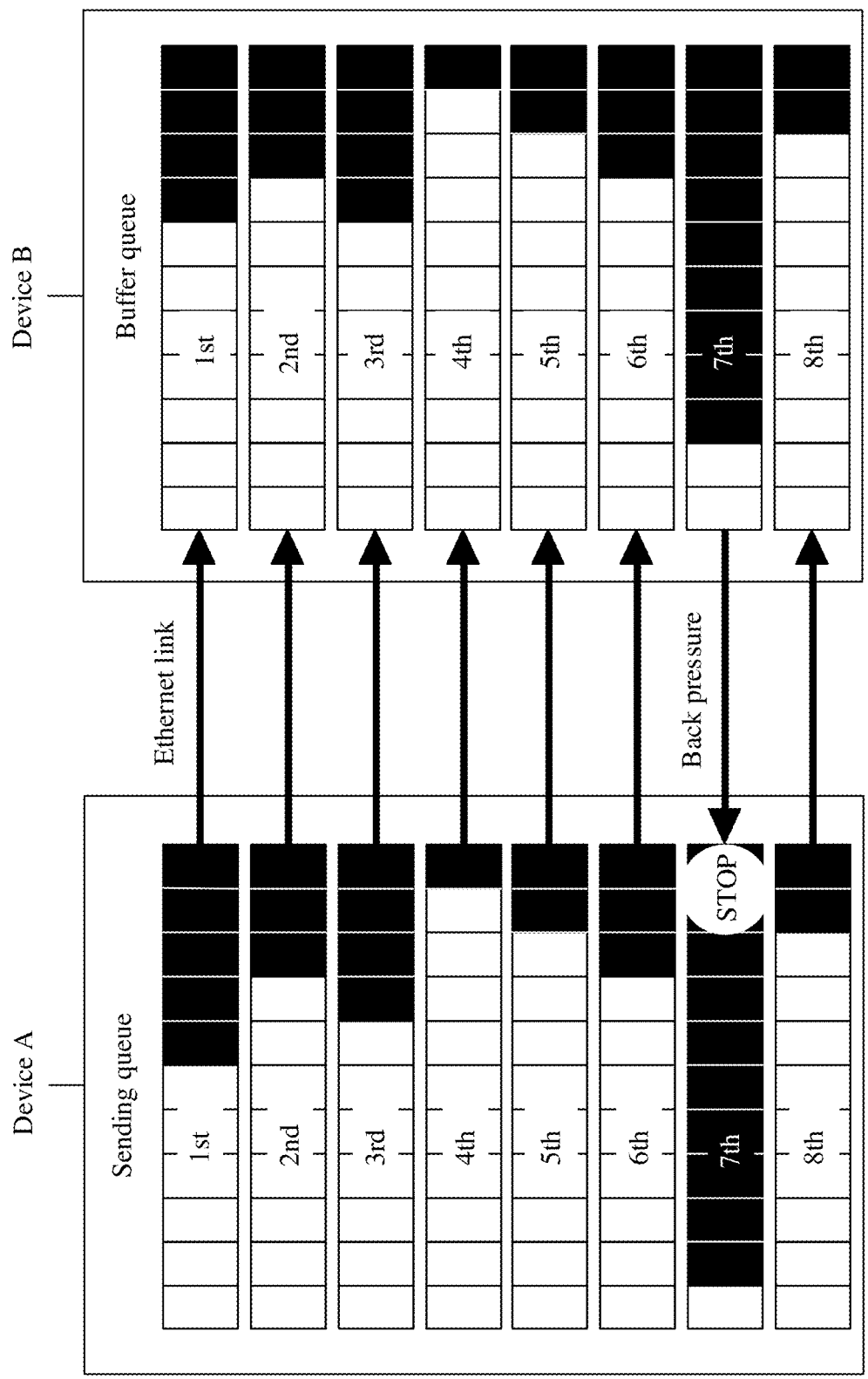
FIG. 2 is a schematic diagram of priority-based flow control according to an embodiment of this application.

As shown in FIG. 2, a sending interface of a device A has eight priority queues, and a receiving interface of a device B has eight receive buffer queues to which buffers are allocated, to form eight virtual channels on a network. The queues with different buffer sizes have different data buffer capabilities. The eight priority queues on the device A one-to-one correspond to the eight receive buffer queues on the device B.

When congestion occurs in a receive buffer queue on the interface of the device B, the device B sends PFC backpressure information to a direction from which data comes (the upstream device A). The device A stops, based on the PFC backpressure information, sending a packet in a corresponding priority queue and stores the packet into a local port buffer. If usage of the local port buffer exceeds a threshold, the device A applies back pressure to an upstream device of the device A. Back pressure is applied level by level until to a network terminal device, to eliminate packet loss caused by congestion on a network node.

2. Credit-Based Flow Control

Figure 3:
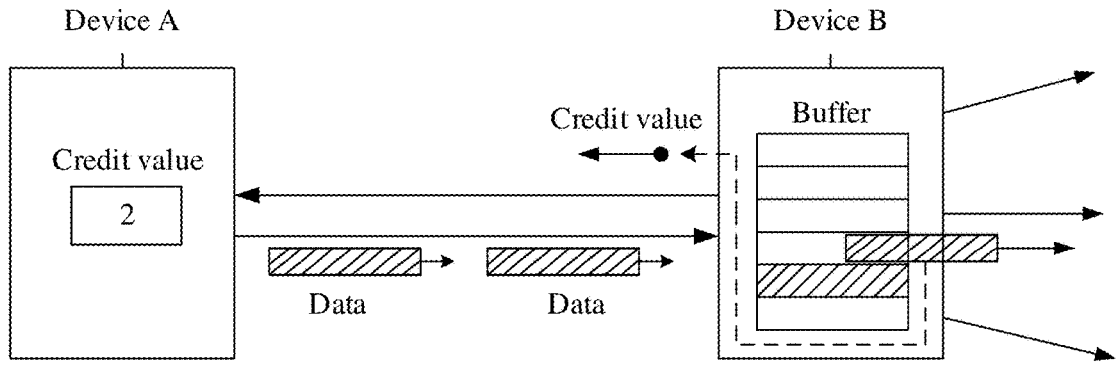
FIG. 3 is a schematic diagram of credit-based flow control according to an embodiment of this application.

As shown in FIG. 3, a device A sends data to a device B. The device B determines a credit value based on available space of a buffer on the device B, and sends a credit allocation message to the device A, where the allocation message carries the credit value. After receiving the credit allocation message, the device A updates an available credit value (that is, adds the value in the credit allocation message). The device A sends a packet to the device B based on the available credit value, and subtracts the available credit value. The device B periodically sends a credit allocation message to the device A based on the available space of the buffer. It may be understood that the available credit value on the device A is a natural number, and cannot be a negative number.

For example, with reference to FIG. 3, a credit value 1 indicates that 64 bytes are available, and the available credit value on the device A is 2. To be specific, the device A can send a packet whose size is less than or equal to 128 bytes. If a size of a first packet sent by the device A to the device B is greater than 64 bytes and less than or equal to 128 bytes, the device A sends the first packet to the device B, and subtracts 2 from the credit value on the device A. In other words, after the device A sends the first packet, the credit value on the device A is 0. If a size of a first packet sent by the device A to the device B is less than or equal to 64 bytes, the device A sends the first packet to the device B, and subtracts 1 from the credit value on the device A. In other words, after the device A sends the first packet, the credit value on the device A is 1. If a size of a first packet sent by the device A to the device B is greater than 128 bytes and less than or equal to 192 bytes, the device A cannot send the first packet to the device B, and sends the first packet to the device B after the credit value on the device A is updated. If the device B determines, based on the available space of the buffer on the device B, that a credit value is 1, the device B sends the credit value to the device A. The device A may update the available credit value on the device A based on the credit value. After the update, the available credit value on the device A is 3. Then the device A sends the first packet to the device B.

An embodiment of this application provides a flow control method, applied to a communications device. The communications device may be a switch, a router, a server, a terminal device, or the like. A specific form of the communications device is not limited in the embodiments of this application. That the communications device is a switch is merely used as an example for description herein.

Figure 4:
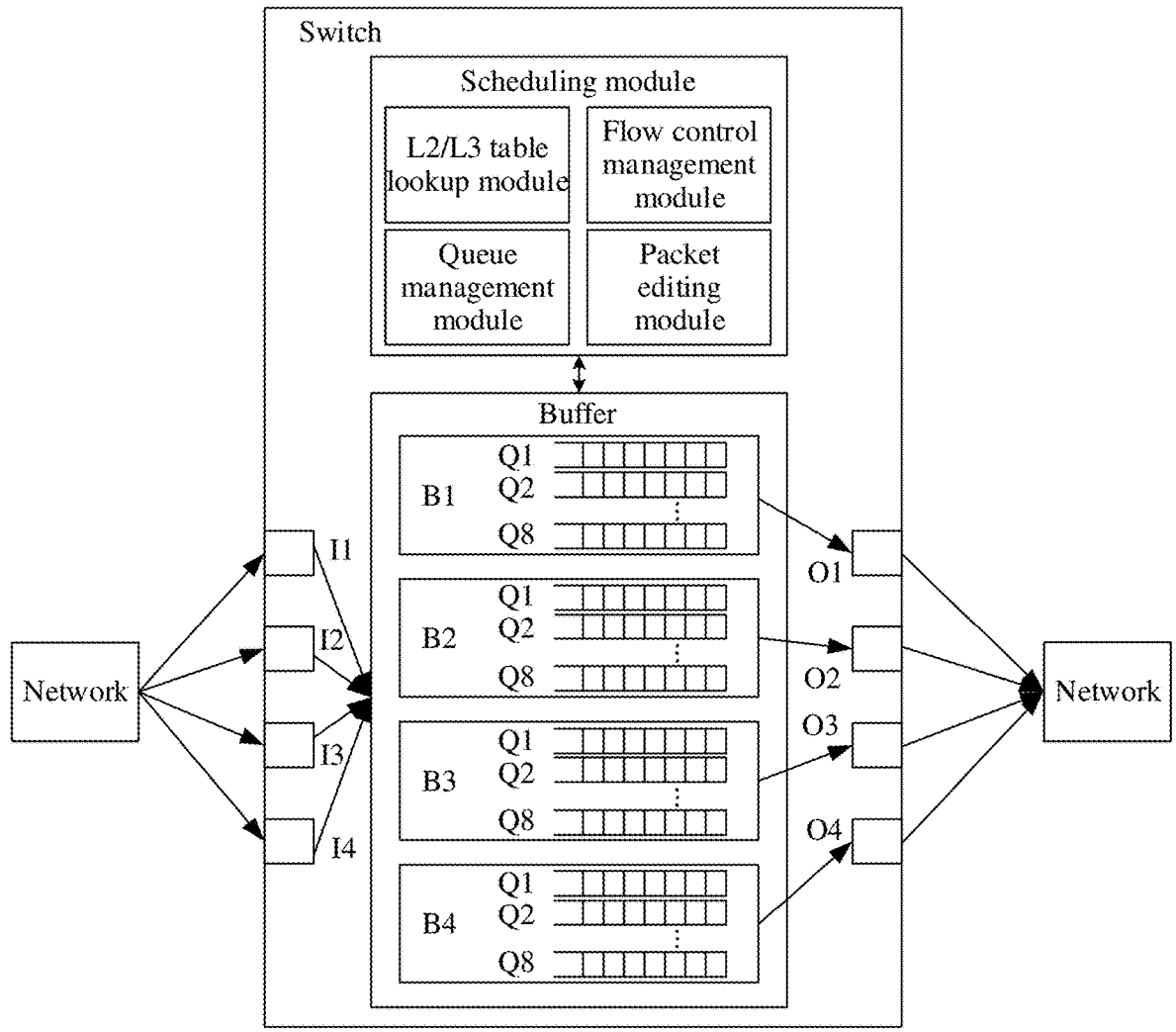
FIG. 4 is a schematic diagram of a structure of a switch according to an embodiment of this application.

A switch shown in FIG. 4 may include four ingress ports and four egress ports. The four ingress ports are I1, I2, I3, and I4, and the four egress ports are O1, O2, O3, and O4. Because the switch can perform bidirectional communication, I1, I2, I3, and I4 may alternatively be ingress ports, and O1, O2, O3, and O4 may alternatively be egress ports. That I1, I2, I3, and I4 are ingress ports and O1, O2, O3, and O4 are egress ports in FIG. 4 is merely used as an example for illustration.

For example, the switch may include a scheduling module and a buffer. The scheduling module is configured to manage a packet. The scheduling module may include an L2/L3 table lookup module, a flow control management module, a queue management module, a packet editing module, and the like. The buffer is configured to buffer a packet. The buffer may include a plurality of packet buffers. Each egress port may correspond to one packet buffer. As shown in FIG. 4, packet buffers corresponding to the egress ports O1 to O4 are respectively B1 to B4. Each packet buffer includes one or more queues, and in this example, includes eight queues, namely, Q1 to Q8.

The L2/L3 table lookup module is configured to look up a table for a packet entering the switch through an ingress port, to determine a next-hop address and an egress port number. For example, if a packet entering through an ingress port is a layer 2 data packet, the L2/L3 table lookup module looks up the table based on a destination MAC address of the packet, to determine an egress port number and/or a next-hop address of the packet. If a packet entering through an ingress port is a layer 3 data packet, the L2/L3 table lookup module looks up the table based on a destination IP address of the layer 3 data packet, to determine an egress port number and/or a next-hop address of the packet.

The queue management module is configured to perform queue scheduling on a packet, for example, enqueuing and dequeuing. For example, when a packet is enqueued, the queue management module may enqueue, based on an egress port number and/or a next-hop address of the packet, the packet into a queue in a buffer corresponding to the egress port number. For example, if the egress port number corresponding to the packet is O1, the packet may be stored in a queue in the buffer B1 corresponding to O1. For example, when a packet is dequeued, the queue management module may remove the packet from a queue on an egress port of the switch, where the packet is referred to as an egress packet.

The flow control management module is configured to perform flow control management on a packet between an upstream switch and a downstream switch. For example, when a packet is enqueued, the flow control management module may count a quantity of packets based on an ingress port number of the packet and a flow control priority in the packet, that is, may add a byte quantity of the ingress packet to a value of a flow control counter. For example, if the ingress port of the packet is I1, and the flow control priority in the packet is 1, the flow control management module may add the byte quantity of the packet to a value of a flow control counter corresponding to the ingress port number that is I1 and the flow control priority that is 1. For example, when a packet is dequeued, the flow control management module may count a quantity of packets based on an ingress port number of the egress packet and a value of a flow control priority in the egress packet, that is, subtract a byte quantity of the egress packet from a value of a flow control counter. Counting the byte quantity of the packet is merely used as an example for description herein. In one embodiment, a quantity of packets, a size of a buffer occupied by a packet, or the like may alternatively be counted. This is not limited in the embodiments of this application.

The packet editing module is configured to perform operations such as modification, deletion, and addition on a header field (a MAC frame header, an IP packet header, a UDP or TCP header, or the like) in a packet or a field at a specific offset position of a packet. For example, when a packet is dequeued, the packet editing module may modify a value of a flow control priority and/or a queue priority in the egress packet.

It should be noted that, when a packet is dequeued, the flow control management module may subtract a byte quantity of the packet from a value of a flow control counter based on a flow control priority in the egress packet, and then the packet editing module modifies a value of the flow control priority and/or a queue priority in the egress packet.

It may be understood that FIG. 4 is merely an example for description, and the structure shown in FIG. 4 constitutes no limitation on the communications device provided in the embodiments of this application.

To resolve the problem in the background such as packet loss or packet accumulation that occurs after a packet is switched between priority queues, an embodiment of this application provides a flow control method. In the method, accurate flow control information can be sent to an upstream device after a packet is switched between priority queues, to avoid packet loss, packet accumulation, network congestion, or the like.

Figure 5:
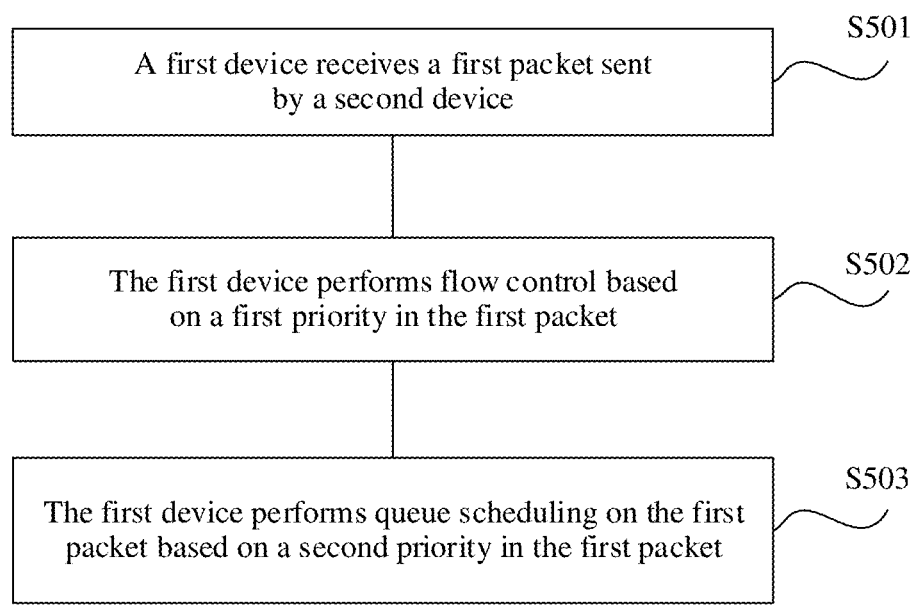
FIG. 5 is a flowchart of a flow control method according to an embodiment of this application.

With reference to FIG. 2 to FIG. 4, as shown in FIG. 5, an embodiment of this application provides a flow control method. The method may include operations S501 to S503.

S501: A first device receives a first packet sent by a second device.

The first device is a downstream receiver device, and the second device is an upstream sender device. It may be understood that a same device may be used as both a sender device and a receiver device.

For example, the first device may have a plurality of upstream devices. A plurality of ingress ports of the first device may receive a packet or packets sent by one or more upstream devices (second devices), but one ingress port of the first device receives only a packet sent by one upstream device. For example, four ingress ports I1 to I4 of a switch B shown in FIG. 6 may receive packets sent by three upstream devices (a switch A1, a switch A2, and a switch A3), but one ingress port of the switch B receives only a packet sent by one egress port of one upstream device.

For example, the first packet may carry a plurality of priorities. For example, the first packet carries a first field and a second field. The first field carries a first priority, and the second field carries a second priority.

For example, the first priority may be used for packet flow control, and the first priority may also be referred to as a flow control priority. The second priority may be used to perform queue scheduling on the first packet, for example, indicate the packet to enter a correct priority queue, and the second priority may also be referred to as a queue priority. An example in which the first priority is the flow control priority and the second priority is the queue priority is used for description in the following embodiments.

Figure 7:
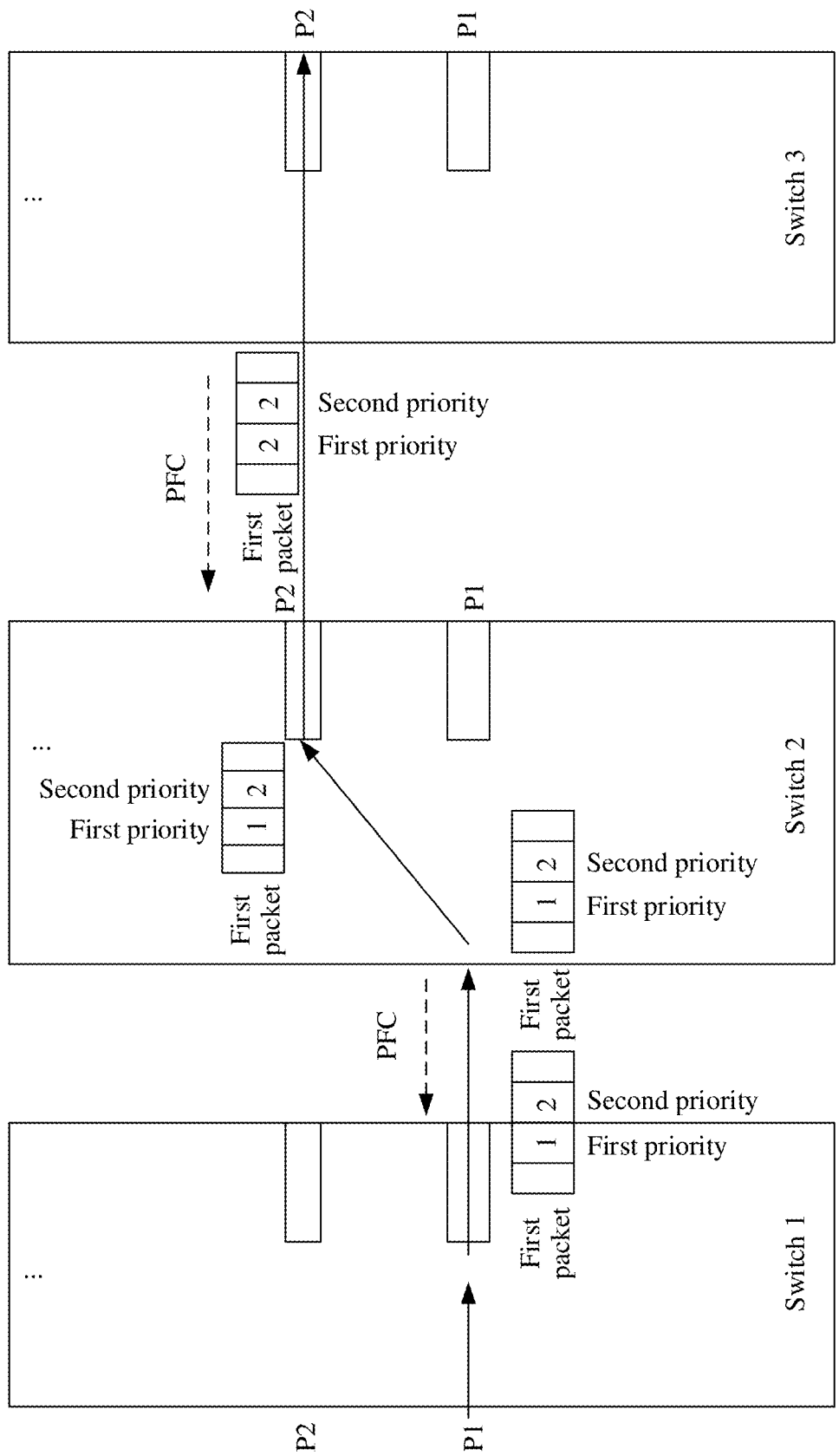
FIG. 7 is a schematic diagram of an application scenario of priority-based flow control according to an embodiment of this application.

As shown in FIG. 7, it is assumed that the first packet sent by a switch 1 (the second device) to a switch 2 (the first device) is switched between priority queues. To be specific, the first packet is switched from a priority queue 1 on the switch 1 to a priority queue 2 on the switch 2. The first packet received by the switch 2 carries two priorities: the first priority (the flow control priority) that is 1, and the second priority (the queue priority) that is 2. It should be noted that, that the first packet is switched from the priority queue 1 on the switch 1 to the priority queue 2 on the switch 2 is merely used as an example for description herein. In one embodiment, a priority queue to which the packet is switched may be determined based on a network status.

In one embodiment, the first packet is a layer 3 internet protocol (Internet Protocol, IP) data packet. When the layer 3 IP data packet carries a plurality of priorities, the first field may be a precedence field in FIG. 8, and the second field may be a delay throughput reliability DTR field in FIG. 8. Alternatively, the first field may be a DTR field in FIG. 8, and the second field may be a precedence field in FIG. 8. This is not limited in this embodiment of this application.

Figure 8:
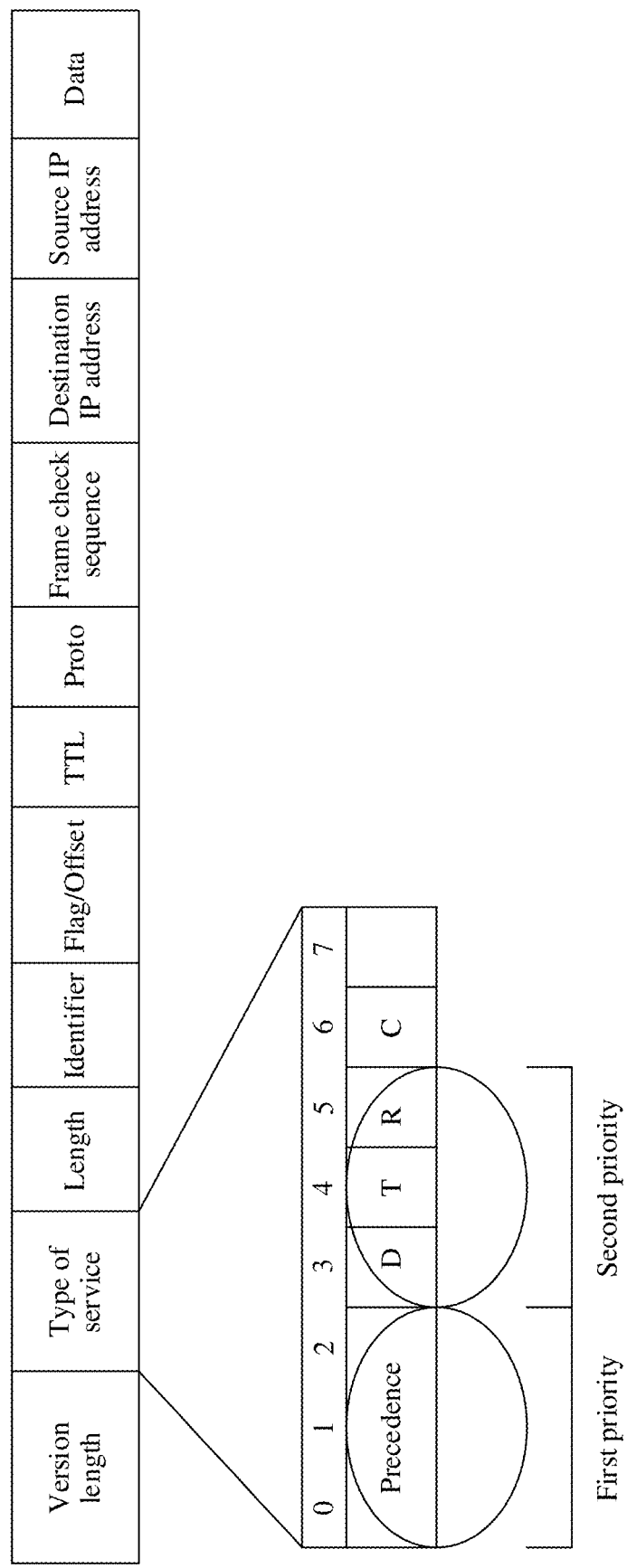
FIG. 8 is a schematic diagram of a packet carrying a plurality of priorities according to an embodiment of this application.

That the first priority is carried in the precedence field and the second priority is carried in the DTR field is merely used as an example in FIG. 8.

For example, the precedence field represents eight priorities of packet transmission, and values of the eight priorities in descending order are respectively 7, 6, 5, 4, 3, 2, 1, and 0, and a highest priority is 7.

For example, in the DTR field, a D (Delay) bit represents a delay, where 0 represents a normal delay, and 1 represents a low delay; a T (Throughput) bit represents a throughput, where 0 represents a normal throughput, and 1 represents a high throughput; and an R (Reliability) bit represents reliability, where 0 represents normal reliability, and 1 represents high reliability.

Figure 9:
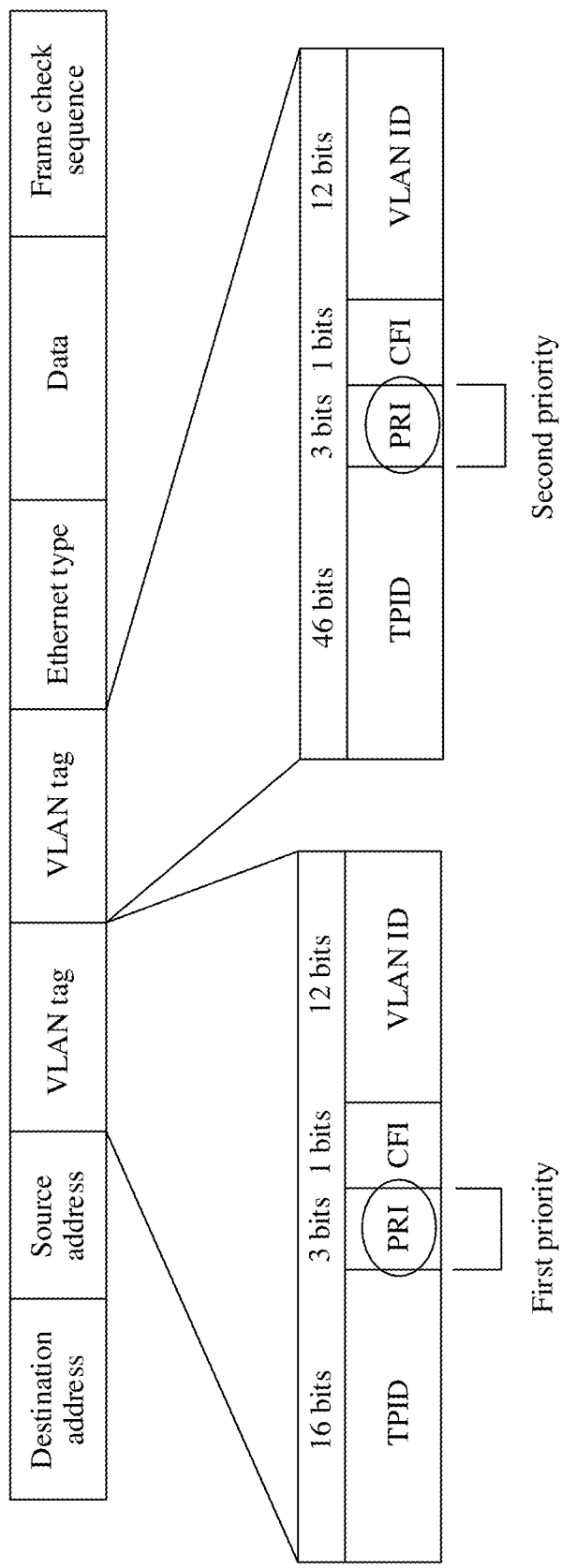
FIG. 9 is a schematic diagram of another packet carrying a plurality of priorities according to an embodiment of this application.

In one embodiment, the first packet may be a layer 2 Ethernet data packet. When the layer 2 Ethernet data packet carries a plurality of priorities, the first field may be a priority (PRI) field in a first virtual local area network (VLAN) tag, and the second field is a PRI field in a second VLAN tag. As shown in FIG. 9, the first field may be a PRI field in either of two VLAN tags, and the second field is a PRI field in the other VLAN tag. It should be noted that the two VLAN tags in FIG. 9 may alternatively be in a nesting relationship.

It should be noted that a specific manner in which the first packet carries the first priority and the second priority is not limited in this embodiment of this application. The foregoing two embodiments are merely examples for description.

It may be understood that, in comparison with the prior art in which a network device forwards a packet based on only one priority, in this embodiment of this application, the packet carries two priorities. One priority in the two priorities is used for packet flow control, and the other priority is used for queue scheduling. Therefore, after the packet is switched between priority queues, there is no confusion caused when there is only one priority.

In one embodiment, because the packet carries two priorities in this embodiment, before operation S501 is performed, an upstream device and a downstream device may perform capability negotiation, to determine whether the downstream device has a capability to carry two priorities.

For example, before operation S501 is performed, the second device may send request information to the first device. The request information is used to request capability information of the first device. After receiving the request information, the first device sends a response message to the second device. The response message is used to indicate whether the first device has the capability to carry two priorities. If the first device has the capability to carry two priorities, the first device sends the first packet to the second device.

S502: The first device performs flow control based on the first priority in the first packet.

It may be understood that operation S502 may be performed by the flow control management module in the scheduling module in the switch shown in FIG. 4.

For example, that the first device performs flow control based on the first priority in the first packet in operation S502 may include: sending, by the first device, flow control information to the second device based on the first priority in the first packet. The flow control information carries the first priority, and the flow control information is used to indicate the second device to perform flow control based on the flow control information.

In one embodiment, operation S502 may include: collecting, by the first device, flow statistics based on the first priority in the first packet, and sending the flow control information to the second device based on a flow statistics result.

For example, a flow control technology in operation S502 may be priority-based flow control PFC, or may be credit-based flow control. A specific flow control technology is not limited in this embodiment of this application. The following separately describes operation S502 in detail by using an example in which the flow control technology is priority-based flow control PFC and an example in which the flow control technology is credit-based flow control.

In one embodiment, the flow control technology in operation S502 is priority-based flow control. In this embodiment, the flow control information includes priority-based flow control PFC information. The PFC information is used to indicate a first port of the second device to perform, based on the first priority, flow control on a packet in a priority queue indicated by the first priority. For example, the PFC information may be specifically a PFC frame. It may be understood that, that PFC flow control is performed on a per-port queue basis is merely used as an example for description in this embodiment of this application. Subsequently, PFC flow control may alternatively be performed at another granularity, for example, on a per-data flow basis, and the data flow may be a 5-tuple data flow or a 3-tuple data flow.

In one embodiment, operation S502 may include operations S5021 to S5023.

S5021: The first device counts a quantity of second packets on the first device based on the first priority in the first packet.

The second packet is a packet in which a first priority is the same as the first priority in the first packet. In other words, the first priority in the second packet is the same as the first priority in the first packet.

For example, the counting a quantity of second packets on the first device based on the first priority in the first packet may include: counting the quantity of second packets, a size (byte quantity) of the second packets, a size of a buffer occupied by the second packets, or the like based on the first priority in the first packet. This is not limited in this embodiment of this application. Counting the byte quantity of the second packets is merely used as an example for description in the following embodiment.

For example, when the quantity of second packets on the first device is counted in operation S5021, the quantity of second packets may be counted at different granularities. For example, the quantity of second packets on each ingress port of the first device may be counted at a granularity of a port of the first device. Alternatively, the quantity of second packets on the first device may be counted at a granularity of the first device.

In a first case, when the quantity of second packets is counted at the granularity of a port of the first device, operation S5021 specifically includes: counting the quantity of second packets on the first device based on the first priority in the first packet and an ingress port number of the first packet. The first priority in the second packet is the same as the first priority in the first packet. In addition, an ingress port number of the second packet is the same as the ingress port number of the first packet.

Figure 6:
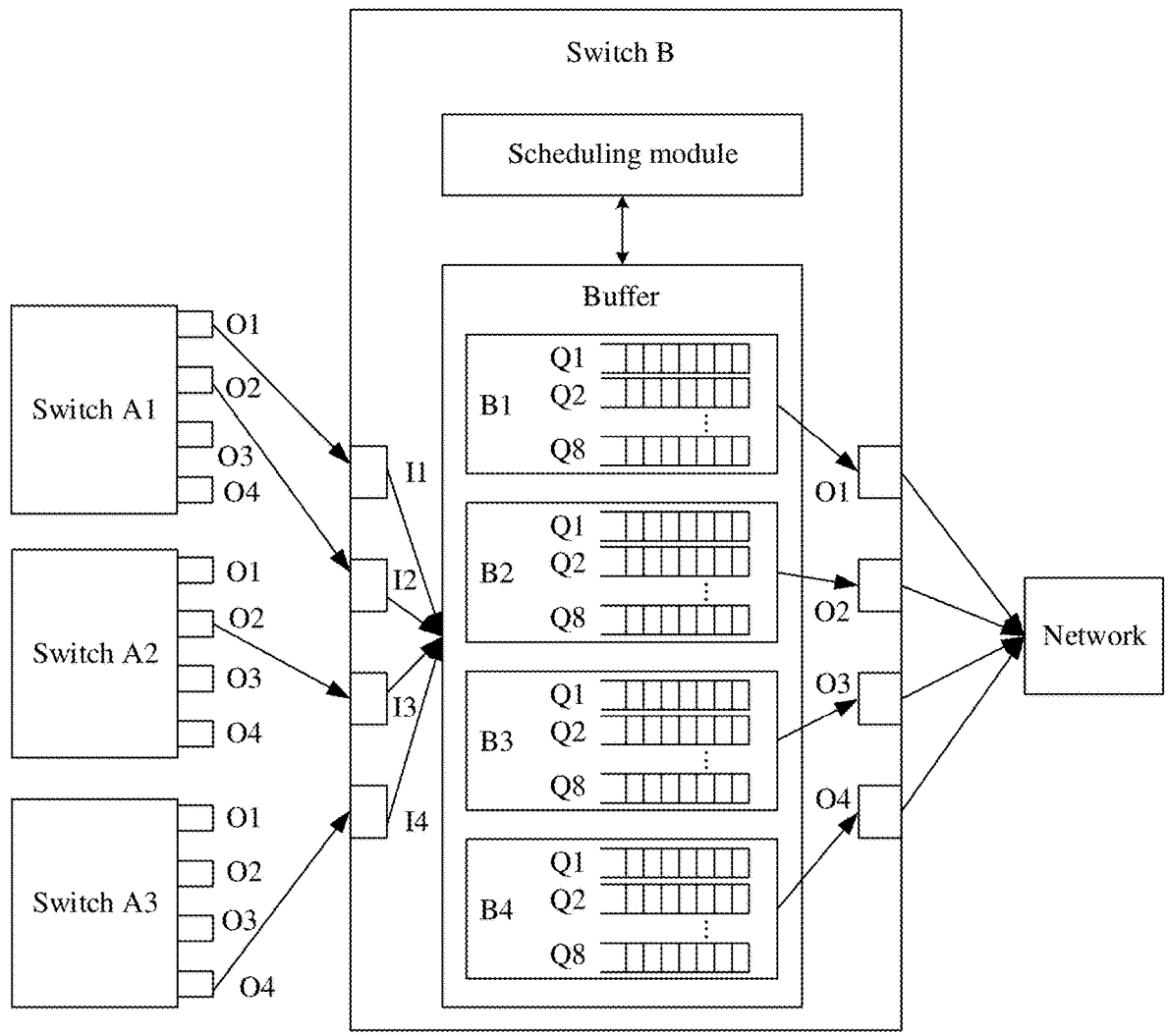
FIG. 6 is a schematic diagram of an application scenario of a flow control method according to an embodiment of this application.

For example, a flow control management module in the switch B may count quantities of packets, with different flow control priorities, that enter the switch B through each ingress port. As shown in FIG. 6, for example, the ingress port of the first packet is I1, and the flow control priority in the first packet is 1. The flow control management module in the switch B may count a quantity of all second packets whose ingress ports are I1 and flow control priorities are 1.

It may be understood that, based on the first case, that the flow control management module counts the quantity of second packets may specifically include: when a packet is enqueued, adding a byte quantity of the ingress packet to a value of a flow control counter based on an ingress port number of the ingress packet and a flow control priority in the ingress packet; when a packet is dequeued, subtracting a byte quantity of the egress packet from a value of a flow control counter based on an ingress port number of the egress packet and a flow control priority in the egress packet. For example, when the ingress port of the ingress packet is I1, and the flow control priority in the ingress packet is 1, the byte quantity of the packet may be added to a value of a flow control counter corresponding to the ingress port number that is I1 and the flow control priority that is 1. When the ingress port of the egress packet is I1, and the flow control priority in the egress packet is 1, the byte quantity of the packet may be subtracted from a value of a flow control counter corresponding to the ingress port number that is I1 and the flow control priority that is 1.

In a second case, when the quantity of second packets is counted at the granularity of the first device, operation S5021 specifically includes: counting the quantity of second packets on the first device based on the first priority in the first packet. The first priority in the second packet is the same as the first priority in the first packet. It may be understood that when the quantity of second packets is counted at the granularity of the device, there is no need to distinguish ingress port numbers of packets.

For example, as shown in FIG. 6, the flow control priority in the first packet is 1. The flow control management module in the switch B may count a quantity of all second packets, with flow control priorities that are 1, that enter the switch B through the four ingress ports. There is no need to distinguish ingress port numbers of the packets.

It may be understood that, based on the second case, that the flow control management module counts the quantity of second packets may specifically include: when a packet is enqueued, adding a byte quantity of the ingress packet to a value of a flow control counter based on a flow control priority in the ingress packet; when a packet is dequeued, subtracting a byte quantity of the egress packet from a value of a flow control counter based on a flow control priority in the egress packet. For example, when the flow control priority in the ingress packet is 1, the byte quantity of the packet may be added to a value of a flow control counter corresponding to the flow control priority that is 1. When the flow control priority in the egress packet is 1, the byte quantity of the packet may be subtracted from a value of a flow control counter corresponding to the flow control priority that is 1.

Figure 10:
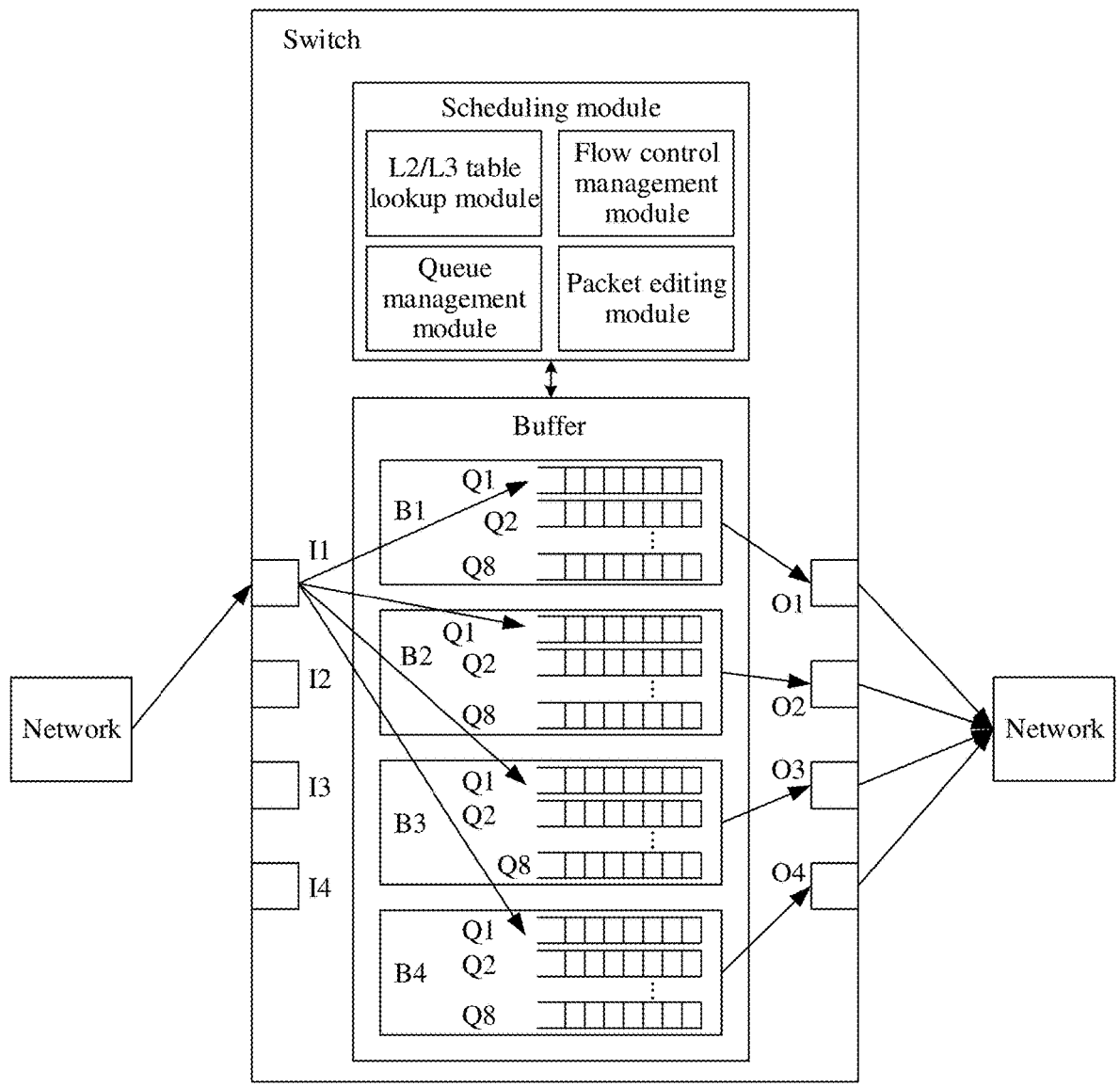
FIG. 10 is a schematic diagram of another application scenario of a flow control method according to an embodiment of this application.
Figure 11:
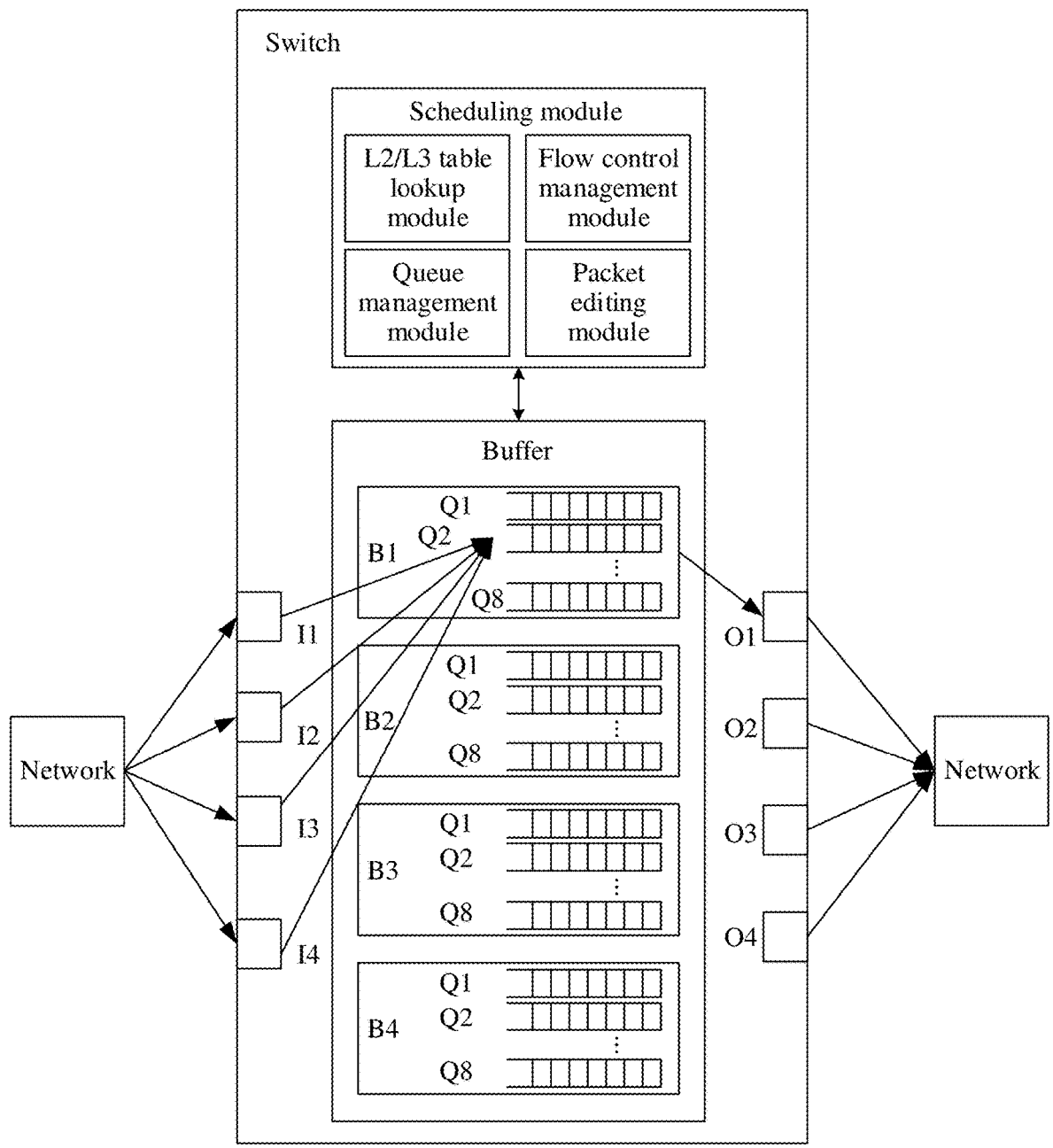
FIG. 11 is a schematic diagram of another application scenario of a flow control method according to an embodiment of this application.

For example, counting the quantity of second packets at the granularity of the device or an ingress port of the device in the foregoing is applicable to various scenarios, such as a scenario in which packets enter the switch B through a plurality of ingress ports and leave the switch B through a plurality of egress ports shown in FIG. 6, a scenario in which packets enter a switch through one ingress port and leave the switch through a plurality of egress ports shown in FIG. 10, a scenario in which packets enter a switch through a plurality of ingress ports and leave the switch through one egress port, or a scenario in which packets enter a switch through one port and leave the switch through one port. This is not limited in this embodiment of this application.

It should be noted that, the counting a quantity of second packets may be counting the byte quantity of the second packets; counting the quantity of second packets if the second packets have a same byte quantity; or counting the size of the buffer occupied by the second packets. This is not limited in this embodiment of this application.

For example, with reference to FIG. 7, the switch 2 counts a quantity of second packets based on a first priority 1 carried in the first packet, or counts a quantity of second packets based on the ingress port number of the first packet and the first priority 1 in the first packet. It should be noted that FIG. 7 shows merely an example for describing the flow control method in this embodiment of this application.

S5022: If it is determined that the quantity of second packets is greater than or equal to a first preset threshold, the first device sends PFC information to the second device.

For example, the PFC information may be a PFC frame. The PFC frame is used to indicate the first port of the second device to temporarily stop sending, to the first device, the packet in the priority queue indicated by the first priority. For example, the PFC frame may be a PFC PAUSE frame, used to notify an upstream device to temporarily stop sending the packet in the priority queue indicated by the first priority. It should be noted that, this is merely intended to describe a function of the PFC frame, and that the PFC frame is referred to as the PFC PAUSE frame is used as an example for description herein.

For example, in a first case corresponding to the first case in operation S5021, when the quantity of second packets is counted at the granularity of a port of the first device, operation S5022 is specifically as follows: The first device sends the PFC frame to the first port of the second device, where the first port of the second device and an ingress port of the first packet are two ports of one link. In other words, the first device sends the PFC frame to the second device at a peer end of the link, where the second device at the peer end of the link corresponds to the ingress port of the first packet.

With reference to FIG. 6, if a quantity of second packets whose ingress port numbers are I2 and flow control priorities are 1 is greater than or equal to the first preset threshold, the switch B sends a PFC PAUSE frame to a second device at a peer end of a link. To be specific, the switch B sends the PFC PAUSE frame to a port O2 of the switch A1. The PFC PAUSE frame is used to indicate the port O2 of the switch A1 to temporarily stop sending a packet in a priority queue 1 to the switch B. It may be understood that the port O2 of the switch A1 and the port I2 of the switch B are two ports of one link, and during backpressure, back pressure is applied only to the second device, at the peer end of the link, corresponding to the ingress port of the first packet.

For example, in a second case corresponding to the second case in operation S5021, when the quantity of second packets is counted at the granularity of the first device, operation S5022 is specifically as follows: The first device sends the PFC frame to a first port of each of one or more second devices, where the first port of each of the one or more second devices and an ingress port of the first device are two ports of one link. In other words, the first device sends the PFC frame to the second devices at peer ends of links, where the second devices at the peer ends of the links correspond to all ingress ports of the first device.

With reference to FIG. 6, if a quantity of second packets whose flow control priorities are 1 is greater than or equal to the first preset threshold, the switch B sends a PFC PAUSE frame to a second device at a peer end of a link. To be specific, the switch B sends the PFC PAUSE frame to each of a port O1 and a port O2 of the switch A1, a port O2 of the switch A2, and a port O4 of the switch A3. The PFC PAUSE frame is used to indicate the port O1 and the port O2 of the switch A1, the port O2 of the switch A2, and the port O4 of the switch A3 to temporarily stop sending a packet in a priority queue 1 to the switch B. It may be understood that the port O1 of the switch A1 and the port I1 of the switch B, the port O2 of the switch 1 and the port I2 of the switch B, the port O2 of the switch A2 and the port I3 of the switch B, or the port O4 of the switch A3 and the port I4 of the switch B are two ports of one link, and during backpressure, back pressure is applied to the second devices, at the peer ends of the links, corresponding to all ingress ports of the first device.

With reference to FIG. 7, in any one of the foregoing embodiments, if the quantity of second packets whose flow control priorities are 1 is greater than or equal to the first preset threshold, and it is determined that congestion occurs in a priority queue indicated by a queue priority 2 in the first packet, that is, the congestion occurs in the priority queue 2 on the switch 2, the switch 2 immediately sends a PFC frame (for example, a PFC PAUSE frame) to an upstream device (for example, the switch 1). The PFC frame is used to notify the switch 1 to temporarily stop sending a packet in the priority queue 1 on the switch 1 to the switch 2.

It may be understood that, in this embodiment of this application, a flow control priority used for flow control is different from a queue priority used for entering a priority queue. Therefore, when congestion occurs in a queue, back pressure can be correctly applied based on the flow control priority, to avoid packet loss.

In one embodiment, in a manner of enabling an upstream device to start to send a packet to a downstream device, the PFC frame carries first duration. The first duration is used to indicate the second device to wait for the first duration after receiving the PFC frame, and start to send, to the first device, the packet in the priority queue indicated by the first priority. It may be understood that, after receiving the PFC frame, the second device temporarily stops sending, to the first device, the packet in the priority queue indicated by the first priority, waits for the first duration, and starts to send, to the first device, the packet in the priority queue indicated by the first priority.

For example, the PFC frame may include two operands: a priority and duration. When a priority queue indicated by a priority in the PFC frame is paused, duration corresponding to the priority is valid. When receiving the PFC PAUSE frame, a first port of an upstream device temporarily stops sending, to a downstream device, a packet in the priority queue indicated by the priority, waits for the duration, and starts to send, to the downstream device, the packet in the priority queue indicated by the priority.

For example, the PFC PAUSE frame may carry pause statuses of eight priority queues, where e(n) indicates that a priority queue n is or is not paused, and time (n) indicates a pause period when the priority queue n is paused. For example, e(1)=1 indicates that a priority queue 1 indicated by a first priority 1 is paused. In this case, time (1) corresponding to the first priority 1 is valid. e(2)=0 in the PFC frame indicates that a priority queue 2 indicated by a first priority 2 is not paused. In this case, time (2) corresponding to the first priority 2 is invalid.

For example, after receiving the PFC frame, the second device temporarily stops sending, to the first device, the packet in the priority queue indicated by the first priority, starts a timer based on the first duration in the PFC frame, and after the timer expires, starts to send, to a downstream device (the first device), the packet in the priority queue indicated by the first priority. It may be understood that, the first duration may be a preset value. After duration of the timer exceeds the first duration, the upstream device considers that congestion no longer occurs on the downstream device, and the upstream device can start to send, to the downstream device, the packet in the priority queue indicated by the first priority.

In one embodiment, if comparatively severe congestion occurs on the downstream device, or the downstream device does not want the upstream device to send, to the downstream device, the packet in the priority queue indicated by the first priority, the downstream device may send the PFC PAUSE frame to the upstream device again before the timer expires.

In one embodiment, in another manner of enabling an upstream device to start to send a packet to a downstream device, after operation S5022 is performed, if it is determined that the quantity of second packets in the first device is less than a second preset threshold, where the second preset threshold is less than or equal to the first preset threshold, operation S5023 is to be performed.

S5023: If it is determined that the quantity of second packets in the first device is less than the second preset threshold, the first device sends PFC information to the second device.

The PFC information may be a PFC frame. The PFC frame is used to indicate the first port of the second device to start to send, to the first device, the packet in the priority queue indicated by the first priority. For example, the PFC frame may be a PFC ON frame, used to notify an upstream device to start to send the packet in the priority queue indicated by the first priority. It should be noted that, this is merely intended to describe a function of the PFC frame, and that the PFC frame is referred to as the PFC ON frame is an example for description herein.

For example, in a first case corresponding to the first case in operations S5021 and S5022, when the quantity of second packets is counted at the granularity level of a port of the first device, operation S5023 is specifically as follows: The first device sends the PFC frame to the first port of the second device, where the first port of the second device and an ingress port of the first packet are two ports of one link. In other words, the first device sends the PFC frame to the second device at a peer end of the link, where the second device at the peer end of the link corresponds to the ingress port of the first packet.

With reference to FIG. 6, if the quantity of second packets whose ingress port numbers are I2 and flow control priorities are 1 is less than the second preset threshold, the switch B sends a PFC ON frame to the second device at the peer end of the link. To be specific, the switch B sends the PFC ON frame to the port O2 of the switch A1. The PFC ON frame is used to indicate the port O2 of the switch A1 to start to send the packet in the priority queue 1 to the switch B. It may be understood that the port O2 of the switch A1 and the port I2 of the switch B are two ports of one link, and during backpressure, back pressure is applied only to the second device, at the peer end of the link, corresponding to the ingress port of the first packet.

For example, in a second case corresponding to the second case in operations S5021 and S5022, when the quantity of second packets is counted at the granularity level of the first device, operation S5023 is specifically as follows: The first device sends the PFC frame to a first port of each of one or more second devices, where the first port of each of the one or more second devices and an ingress port of the first device are two ports of one link. In other words, the first device sends the PFC frame to the second devices at peer ends of links, where the second devices at the peer ends of the links correspond to all ingress ports of the first device.

With reference to FIG. 6, if the quantity of second packets whose flow control priorities are 1 is less than the second preset threshold, the switch B sends a PFC ON frame to each of the port O1 and the port O2 of the switch A1, the port O2 of the switch A2, and the port O4 of the switch A3. The PFC ON frame is used to indicate the port O1 and the port O2 of the switch A1, the port O2 of the switch A2, and the port O4 of the switch A3 to start to send the packet in the priority queue 1 to the switch B. It may be understood that the port O1 of the switch A1 and the port I1 of the switch B, the port O2 of the switch 1 and the port I2 of the switch B, the port O2 of the switch A2 and the port I3 of the switch B, or the port O4 of the switch A3 and the port I4 of the switch B are two ports of one link, and flow control is performed on the second devices, at the peer ends of the links, corresponding to all ingress ports of the first device.

With reference to FIG. 7, in any one of the foregoing embodiments, if the quantity of second packets whose flow control priorities are 1 is less than the second preset threshold, and it is determined that congestion no longer occurs in the priority queue indicated by the queue priority 2 in the first packet, that is, congestion no longer occurs in the priority queue 2 on the switch 2, the switch 2 sends a PFC ON frame to an upstream device (for example, the switch 1). The PFC ON frame is used to notify the switch 1 to start to send the packet in the priority queue 1 on the switch 1 to the switch 2.

It may be understood that, in this embodiment of this application, a flow control priority used for flow control is different from a queue priority used for queue scheduling. Therefore, when congestion no longer occurs in a queue, an upstream sending device can be indicated, based on a flow control priority, to start to send a packet in a priority queue indicated by the flow control priority, to avoid packet loss.

In one embodiment, the flow control technology in operation S502 is credit-based flow control. In this embodiment, the flow control information includes credit-based flow control Credit information. The Credit information is used to indicate the second device to update, based on a first credit value corresponding to the first priority, a credit value corresponding to a priority queue indicated by the first priority.

In one embodiment, operation S502 may include operations S5024 and S5025.

S5024: The first device determines the first credit value based on the first priority in the first packet.

The first credit value is a credit value corresponding to the first priority.

For example, the first device may determine, based on available space of a buffer on the first device, the first credit value corresponding to the first priority.

For example, as shown in FIG. 6, if the ingress port I1 corresponds to a buffer B1, the ingress port I2 corresponds to a buffer B2, the ingress port I3 corresponds to a buffer B3, and the ingress port I4 corresponds to a buffer B4, the switch B may determine, based on available space of each buffer on the switch B, a credit value corresponding to each first priority in the buffers B1, B2, B3, and B4.

Figure 12:
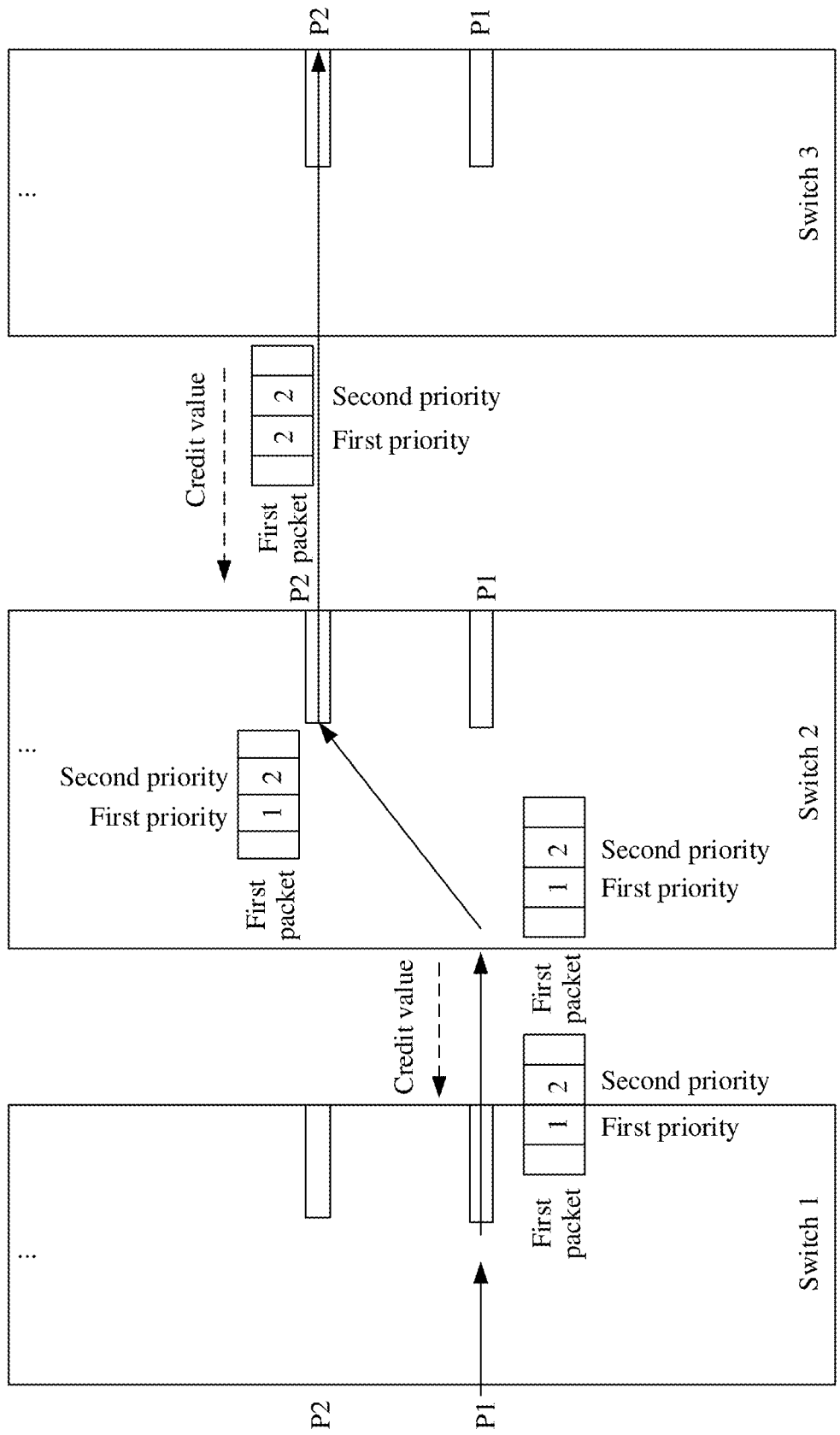
FIG. 12 is a schematic diagram of an application scenario of credit-based flow control according to an embodiment of this application.

With reference to FIG. 12, a switch 2 may determine, based on available space of a buffer on the switch 2, a first credit value corresponding to a flow control priority 1. For example, the first credit value is 2. It should be noted that FIG. 12 shows merely an example for describing the flow control method in this embodiment of this application.

S5025: The first device sends the Credit information to the second device.

The Credit information carries the first credit value and the first priority. The Credit information is used to indicate a first port of the second device to update, based on the first credit value corresponding to the first priority, the credit value corresponding to the priority queue indicated by the first priority.

As shown in FIG. 6, for example, the second device is the switch A1, the first priority is 1, and the second priority is 2. If the switch B determines that a credit value corresponding to a priority queue 2 in the buffer B1 is 2, the switch B sends Credit information to the switch A1. The Credit information is used to indicate the switch A1 to update, based on the credit value that is 2, a credit value corresponding to a priority queue 1 on the switch A1.

With reference to FIG. 12, the switch 2 sends Credit information to a switch 1. The Credit information includes the first credit value corresponding to the flow control priority 1. After receiving the Credit information, the switch 1 may update an available credit value for a priority queue 1 on the switch 1 based on the first credit value in the Credit information. For example, if the available credit value for the priority queue 1 on the switch 1 is 3 before the switch 1 receives the Credit information, after receiving the Credit information, the switch 1 updates the available credit value for the priority queue 1 on the switch 1 based on the Credit information. If the first credit value in the Credit information is 2, the updated available credit value for the priority queue 1 on the switch 1 is 2+3=5. It should be noted that, that the first packet is switched from the priority queue 1 on the switch 1 to a priority queue 2 on the switch 2 in FIG. 12 is merely used as an example for describing the flow control method in this embodiment of this application.

It should be noted that, when credit-based flow control is used, and switching is performed between priority queues, a credit value is sent based on a flow control priority. In this way, a credit value corresponding to a flow control priority can be sent for a priority queue, indicated by the flow control priority, on a sender device. Therefore, a credit value can be correctly sent to a sender, to avoid packet accumulation, network congestion, or the like.

S503: The first device performs queue scheduling on the first packet based on the second priority in the first packet.

It may be understood that operation S503 may be performed by the queue management module in the scheduling module in the switch shown in FIG. 4.

For example, the first device may store, based on the second priority, the first packet into a priority queue indicated by the second priority. For example, as shown in FIG. 7 or FIG. 12, the switch 2 stores, based on the queue priority 2 in the first packet, the first packet into the priority queue 2 on the switch 2.

It should be noted that operation S503 may be performed before operation S502, or may be performed after operation S503, or operations S502 and S503 may be simultaneously performed. An execution sequence of operation S502 and operation S503 is not limited in this embodiment of this application.

It may be understood that in this embodiment of this application, a packet carries two priorities. One priority is used for flow control, and the other priority is used for queue scheduling. Compared with the prior art in which only one priority is used, this application can avoid packet loss that occurs because back pressure cannot be correctly applied or a credit value cannot be correctly sent when switching is performed between priority queues.

In one embodiment, the first device receives the first packet sent by the second device, where the first packet carries the first priority and the second priority; the first device performs flow control based on the first priority in the first packet; and the first device performs queue scheduling on the first packet based on the second priority in the first packet. In this embodiment, a packet carries two priorities. One priority is used for flow control, and the other priority is used for queue scheduling. In this way, accurate flow control information can be sent to an upstream device after the packet is switched between priority queues, to avoid packet loss, packet accumulation, network congestion, or the like.

Figure 13:
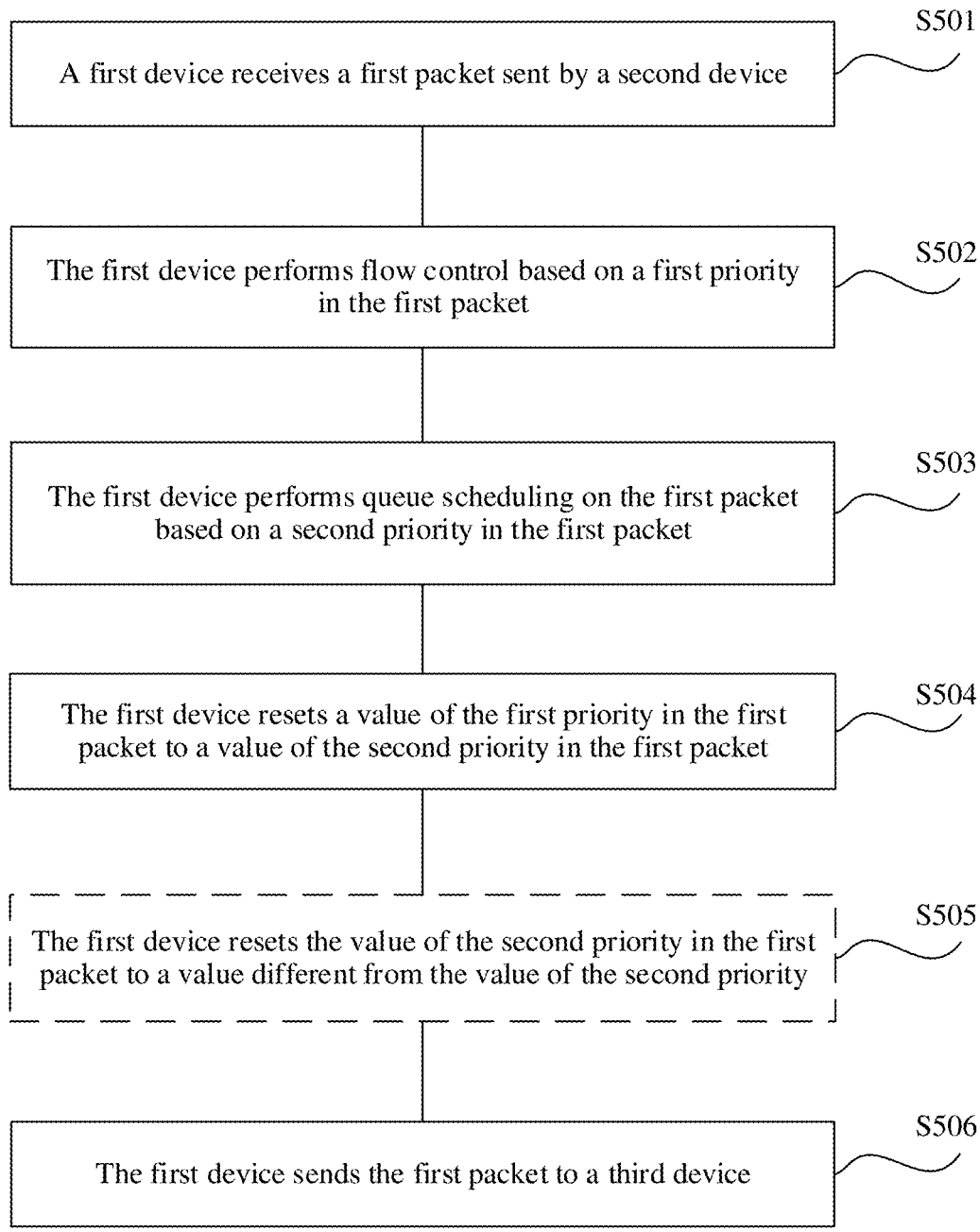
FIG. 13 is a flowchart of another flow control method according to an embodiment of this application.

Further, as shown in FIG. 13, after operation S503 is performed, the method may further include operations S504 to S506.

S504: The first device resets a value of the first priority in the first packet to a value of the second priority in the first packet.

It may be understood that operation S504 may be performed by the packet editing module in the scheduling module in the switch shown in FIG. 4.

In one embodiment, when operation S504 is performed, the first device may determine whether the value of the first priority in the first packet is the same as that of the second priority in the first packet. When the value of the first priority is different from that of the second priority, the first device resets the value of the first priority in the first packet to the value of the second priority in the first packet.

In one embodiment, when operation S504 is performed, the first device may directly reset the value of the first priority in the first packet to the value of the second priority in the first packet without determining whether the value of the first priority in the first packet is the same as that of the second priority in the first packet. It may be understood that the two embodiments have a same effect, but the second embodiment is simpler than the first embodiment.

For example, as shown in FIG. 7 or FIG. 12, a packet editing module in a second switch may change the value of the flow control priority in the first packet to the value of the queue priority in the first packet at an egress of the switch 2. To be specific, in the first packet, the flow control priority is 2, and the queue priority is 2. In this way, a switch 3 may perform flow control according to operations S501 to S503. For example, when congestion occurs in a priority queue 2 on the switch 3, the switch 3 can correctly apply back pressure to the priority queue 2 on the switch 2.

S505: The first device resets the value of the second priority in the first packet to a value different from the value of the second priority. (Optional)

It may be understood that operation S505 may be performed by the packet editing module in the scheduling module in the switch shown in FIG. 4.

For example, the first device may determine, according to a preset rule, whether to switch the first packet between priority queues. If the first device determines to switch the first packet between the priority queues, operation S505 is performed. The first device resets the value of the second priority in the first packet to the value different from the value of the second priority. The value different from the value of the second priority is a value corresponding to a priority queue, for the first packet, on the downstream device.

Figure 14:
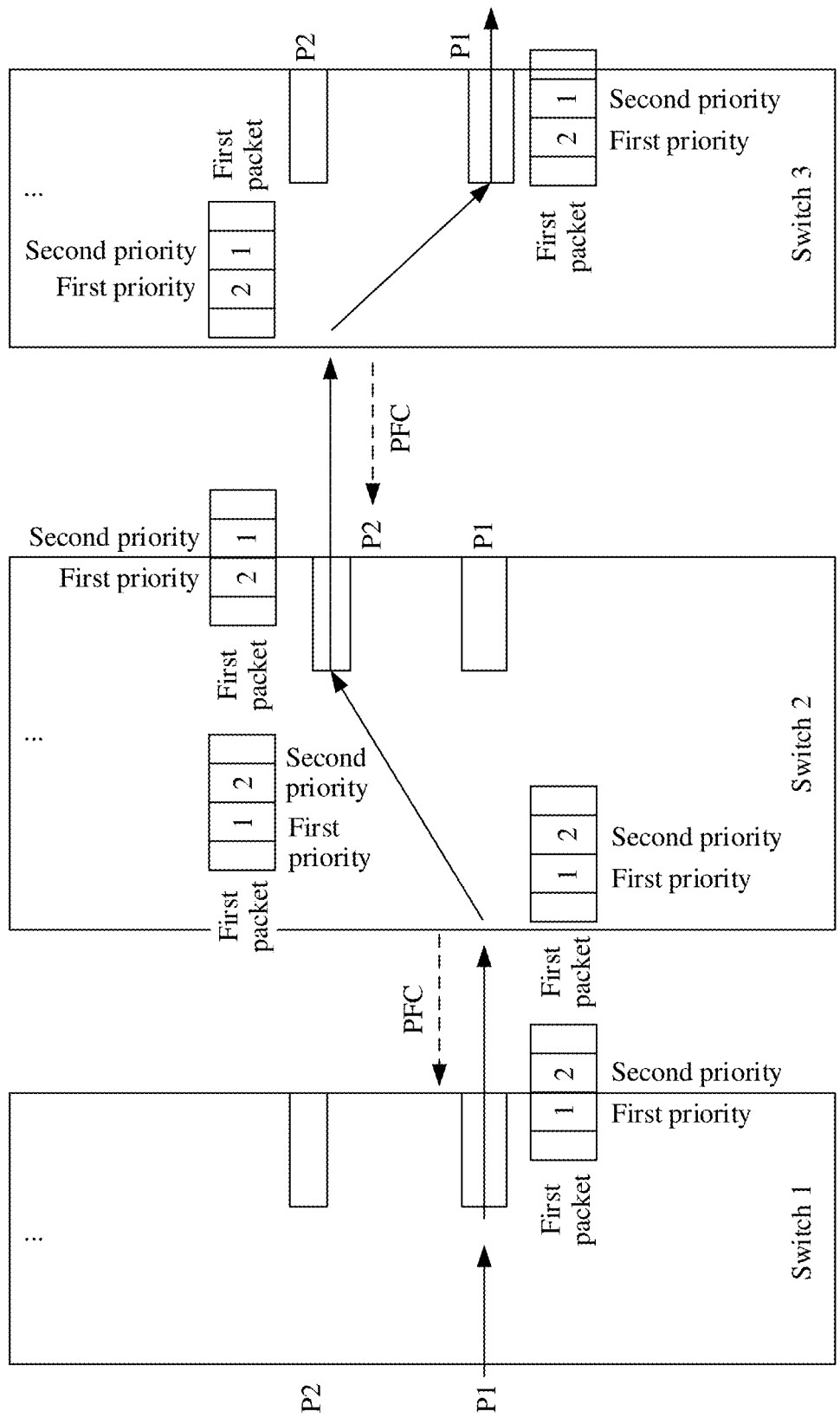
FIG. 14 is a schematic diagram of another application scenario of priority-based flow control according to an embodiment of this application.

As shown in FIG. 14, if a switch 2 determines, according to a preset rule, to switch the first packet between priority queues, the switch 2 may switch the second priority in the first packet from a priority 2 to a priority 1, and reset, at an egress of the switch 2, the value of the second priority in the first packet to a value 1 corresponding to a priority queue, for the first packet, on a switch 3, that is, reset the value of the second priority to 1. In this way, the switch 3 may perform flow control according to operations S501 to S503. For example, when congestion occurs in the priority queue 1 on the switch 3, the switch 3 can correctly apply back pressure to a priority queue 2 on the switch 2. That the first packet is switched from the priority queue 2 on the switch 2 to the priority queue 1 on the switch 3 in FIG. 14 is merely used as an example for description. In one embodiment, the first packet may alternatively be switched to another priority queue. This is not limited in this embodiment of this application. It should be noted that FIG. 14 shows merely an example for describing the flow control method in this embodiment of this application.

For example, the first device may determine, based on different scenarios, whether to switch the first packet between the priority queues. For example, the first packet may be switched between the priority queues to resolve a network deadlock, or the first packet may be switched between the priority queues to relieve network congestion. A scenario of determining to switch the packet between the priority queues is not limited in this embodiment of this application. Any scenario of switching the packet between the priority queues falls within the protection scope of this embodiment of this application.

It should be noted that, after the flow control management module performs flow control on the packet in operation S502, the packet editing module resets the value of the flow control priority and/or the queue priority in operations S504 and S505. In other words, the packet editing module has not reset the value of the flow control priority and/or the queue priority when operation S502 is performed. This can ensure accuracy of PFC flow statistics collection and the first credit value, and also avoid packet loss, packet accumulation, network congestion, or the like that occurs after switching is performed between priority queues.

Operation S506 may be performed after operation S504 or S505.

S506: The first device sends the first packet to a third device.

The third device is a downstream device of the first device. The value of the first priority in the first packet has been reset, or both the value of the first priority in the first packet and the value of the second priority in the first packet have been reset.

In one embodiment, if the first device determines not to switch the first packet between the priority queues, that is, a queue priority in the first packet in the third device is the same as that in the first device, operations S504 and S506 are performed. The first device resets the value of the first priority in the first packet to the value of the second priority in the first packet, and then sends, to the third device, the first packet with the first priority whose value is reset.

In one embodiment, if the first device determines to switch the first packet between the priority queues, that is, a queue priority in the first packet in the third device is different from that in the first device, operations S504 to S506 are performed. The first device resets the value of the first priority in the first packet to the value of the second priority in the first packet, resets the value of the second priority in the first packet to the value different from the value of the second priority, and then sends, to the third device, the first packet with the first priority and second priority whose values are reset.

In one embodiment, the first device receives the first packet sent by the second device, where the first packet carries the first priority and the second priority; the first device performs flow control based on the first priority in the first packet; the first device performs queue scheduling on the first packet based on the second priority in the first packet; the first device resets the value of the first priority in the first packet to the value of the second priority in the first packet; the first device resets the value of the second priority in the first packet to the value different from the value of the second priority; and the first device sends the first packet to the third device. In this embodiment, a packet carries two priorities. One priority is used for flow control, and the other priority is used for queue scheduling. In this way, accurate flow control information can be sent to an upstream device after the packet is switched between priority queues, to avoid packet loss, packet accumulation, network congestion, or the like. In addition, the value of the first priority in the first packet is reset to the value of the second priority in the first packet, so that accurate flow control information can be sent to the first device when a downstream device of the first device performs flow control.

Figure 15:
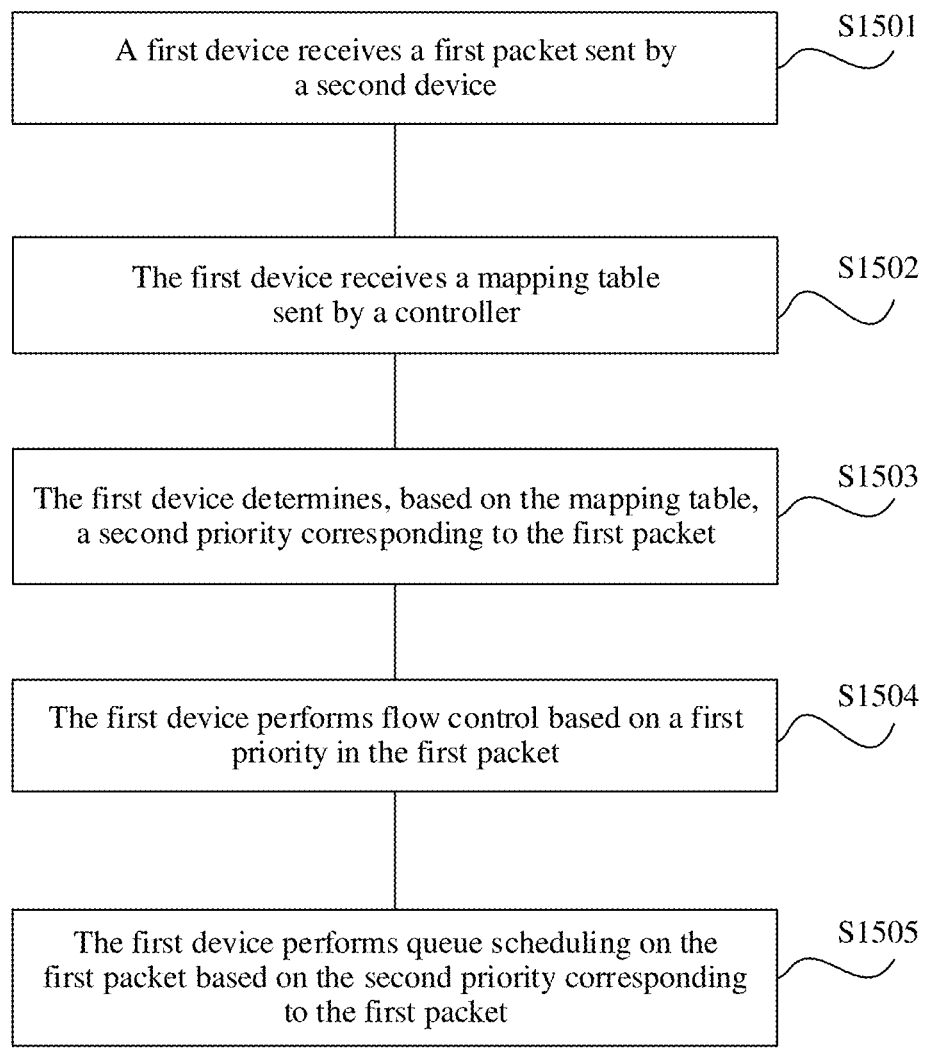
FIG. 15 is a flowchart of another flow control method according to an embodiment of this application.

This application provides another flow control method. As shown in FIG. 15, the method includes operations S1501 to S1505.

S1501: A first device receives a first packet sent by a second device.

The first device is a downstream receiver device, and the second device is an upstream sender device. It may be understood that a same device may be used as both a sender device and a receiver device.

The first packet carries a first field, and the first field carries a first priority. For example, the first priority may be used for packet flow control, and the first priority may also be referred to as a flow control priority.

S1502: The first device receives a mapping table sent by a controller.

The mapping table includes a correspondence between identification information of a packet and a second priority.

For example, the identification information may be information for uniquely identifying the packet. For example, the identification information may be a source IP address and a destination IP address of the packet, 5-tuple information of the packet, or the like. Specific content of the identification information is not limited in this embodiment of this application. This is merely an example for description.

It should be noted that before operation S1502 is performed, the controller may determine, by collecting a network status, whether a network deadlock occurs. If a network deadlock occurs, the controller determines to switch the first packet between priority queues, and sends the mapping table to the first device. Alternatively, the controller may determine, by collecting a network status, whether network congestion occurs. If network congestion occurs, the controller determines to switch the first packet between priority queues, and sends the mapping table to the first device. A specific scenario of switching the packet between the priority queues is not limited in this embodiment of this application. Any scenario of switching the packet between the priority queues falls within the protection scope of this embodiment of this application. This is merely an example for description herein.

S1503: The first device determines, based on the mapping table, a second priority corresponding to the first packet.

The second priority is used for queue scheduling, and the second priority may also be referred to as a queue priority.

Figure 16:
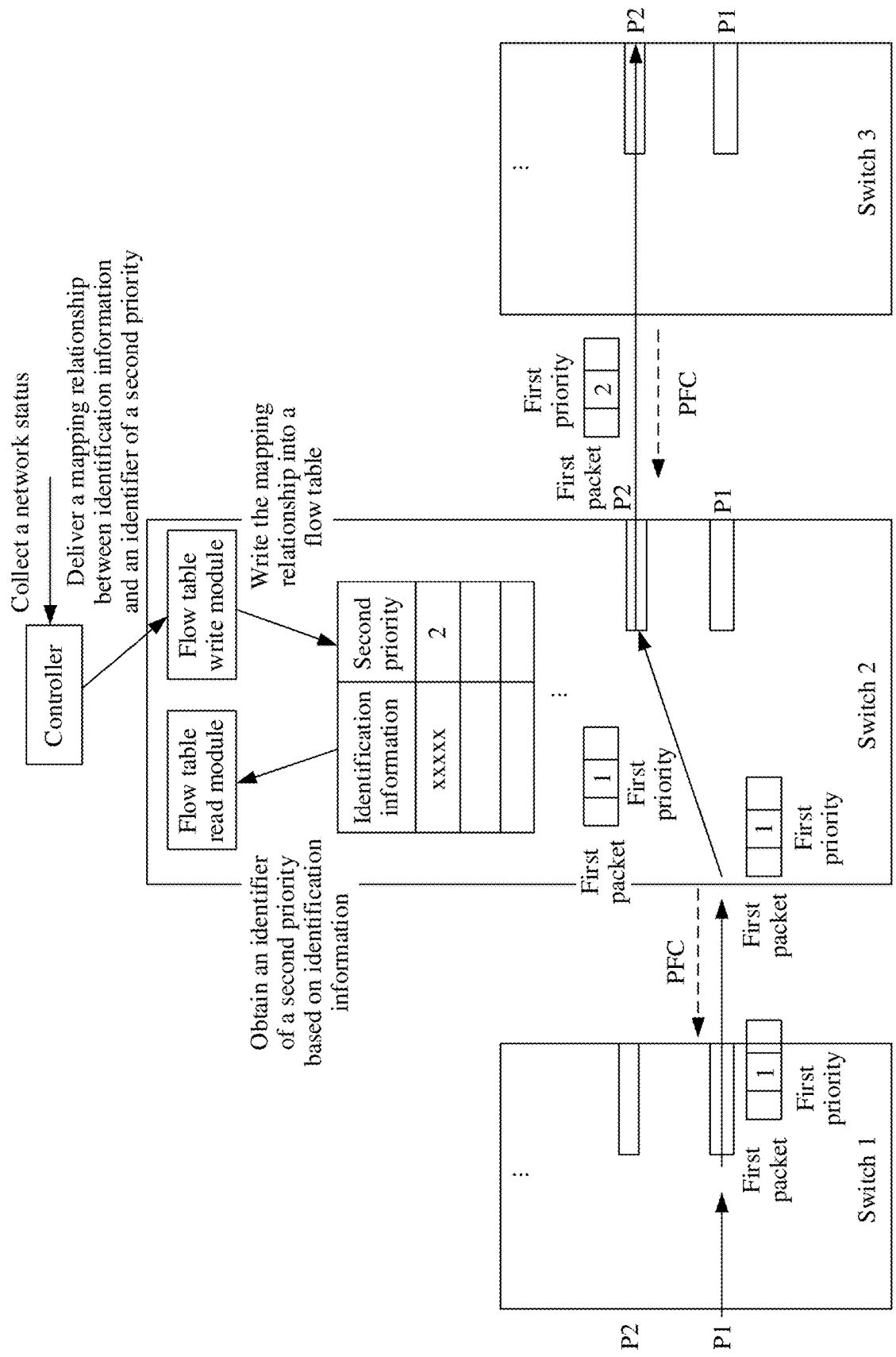
FIG. 16 is a schematic diagram of another application scenario of priority-based flow control according to an embodiment of this application.

For example, as shown in FIG. 16, operation S1503 may specifically include: writing, by a flow table write module in the first device based on the mapping relationship that is sent by the controller and that is between identification information of a packet and a second priority, the mapping relationship into a storage entry (flow table) in the first device; and reading, by a flow table read module in the first device, the correspondence that is in the storage entry in the first device and that is between identification information and a second priority, to obtain the second priority corresponding to the first packet. It should be noted that FIG. 16 shows merely an example for describing the flow control method in this embodiment of this application.

S1504: The first device performs flow control based on the first priority in the first packet.

It should be noted that an embodiment of operation S1504 in which the first device performs flow control based on the first priority in the first packet is the same as that of operation S502. For details, refer to the description in operation S502. Details are not described herein again.

S1505: The first device performs queue scheduling on the first packet based on the second priority corresponding to the first packet.

It should be noted that an embodiment of operation S1505 in which the first device performs queue scheduling on the first packet based on the second priority corresponding to the first packet is the same as that of operation S503. For details, refer to the description in operation S503. Details are not described herein again.

It may be understood that a difference between this embodiment of this application and the foregoing embodiment is that in this embodiment of this application, a packet carries only one priority, and the other priority is obtained by looking up the mapping table sent by the controller. Therefore, flow control is also performed based on two priorities in this embodiment. This can avoid packet loss, packet accumulation, network congestion, or the like after switching is performed between priority queues. In comparison with the foregoing embodiment in which a packet carries two priorities, in this embodiment, a packet carries only one priority, a data plane packet may not be changed, and the second priority is directly obtained from the mapping table sent by the controller.

In this embodiment of this application, the first device receives the first packet sent by the second device, where the first packet carries the first priority; the first device receives the mapping table sent by the controller, where the mapping table includes the correspondence between identification information of a packet and a second priority; the first device determines, based on the mapping table, the second priority corresponding to the first packet; the first device performs flow control based on the first priority in the first packet; and the first device performs queue scheduling based on the second priority corresponding to the first packet. In this embodiment, the first priority is carried in the packet, and the second priority is obtained from the mapping table sent by the controller. The first priority is used for flow control, and the second priority is used for queue scheduling. In this way, accurate flow control information can be sent to an upstream device after the packet is switched between priority queues, to avoid packet loss, packet accumulation, network congestion, or the like.

Figure 17:
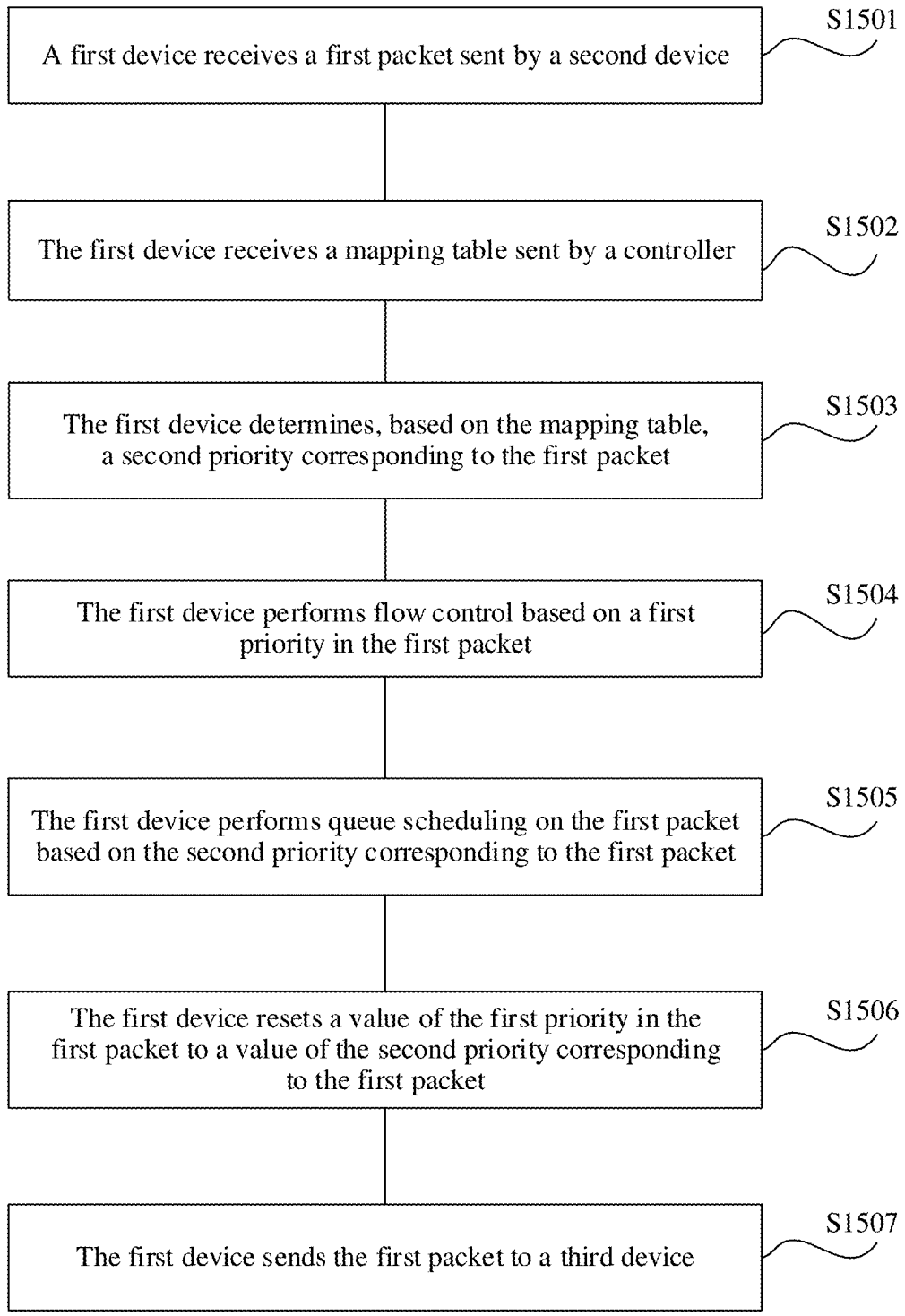
FIG. 17 is a flowchart of another flow control method according to an embodiment of this application.

Further, as shown in FIG. 17, after operation S1505 is performed, the method may further include operations S1506 and S1507.

S1506: The first device resets a value of the first priority in the first packet to a value of the second priority corresponding to the first packet.

For example, in this embodiment, the packet carries only the flow control priority, and the queue priority is obtained based on the mapping table sent by the controller. Therefore, the first device only needs to reset the value of the first priority in the first packet to the value of the second priority corresponding to the first packet. In this way, a switch 3 in FIG. 16 may perform flow control according to operations S1501 to S1505. For example, when congestion occurs in a priority queue 2 on the switch 3, the switch 3 can correctly apply back pressure to a priority queue 2 on a switch 2.

S1507: The first device sends the first packet to a third device.

The third device is a downstream device of the first device. The value of the first priority in the first packet has been reset.

For example, the first device may reset the value of the first priority in the first packet to the value of the second priority corresponding to the first packet, and then send, to the third device, the first packet with the first priority whose value is reset.

In this embodiment of this application, the first device receives the first packet sent by the second device, where the first packet carries the first priority; the first device receives the mapping table sent by the controller, where the mapping table includes the correspondence between identification information of a packet and a second priority; the first device determines, based on the mapping table, the second priority corresponding to the first packet; the first device performs flow control based on the first priority in the first packet; the first device performs queue scheduling on the first packet based on the second priority corresponding to the first packet; the first device resets the value of the first priority in the first packet to the value of the second priority corresponding to the first packet; and the first device sends the first packet to the third device. In this embodiment, the first priority is carried in the packet, and the second priority is obtained from the mapping table sent by the controller. The first priority is used for flow control, and the second priority is used for queue scheduling. In this way, accurate flow control information can be sent to an upstream device after the packet is switched between priority queues, to avoid packet loss, packet accumulation, network congestion, or the like. In addition, the value of the first priority is reset to the value of the second priority, so that accurate flow control information can be sent to the first device when a downstream device of the first device performs flow control.

The foregoing mainly describes the solutions provided in the embodiments of this application from a perspective of method operations. It may be understood that, to implement the foregoing functions, a switch includes corresponding hardware structures and/or software modules for performing the functions. A person skilled in the art should easily be aware that, in combination with the examples described in the embodiments disclosed in this specification, modules and algorithm operations may be implemented by a combination of hardware and computer software in this application. The person skilled in the art may use different methods to implement the described functions for each particular application, but it should not be considered that the embodiment goes beyond the scope of this application.

In the embodiments of this application, the computer may be divided into functional modules based on the foregoing method examples. For example, functional modules may be obtained through division based on corresponding functions, or two or more functions may be integrated into one processing module. The integrated module may be implemented in a form of hardware, or may be implemented in a form of a software functional module. It should be noted that division into the modules in the embodiments of this application is an example, is merely logical function division, and may be other division in actual implementation.

Figure 18:
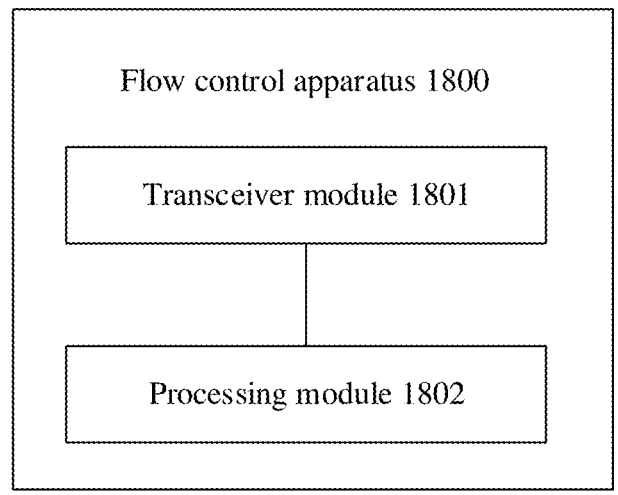
FIG. 18 is a schematic composition diagram of a flow control apparatus according to an embodiment of this application.

When the functional modules are obtained through division based on the corresponding functions, FIG. 18 is a schematic diagram of a possible structure of a flow control apparatus in the foregoing embodiments. The flow control apparatus 1800 includes a transceiver module 1801 and a processing module 1802. The transceiver module 1801 may be configured to support the flow control apparatus 1800 in performing S501 in FIG. 5, S506 in FIGS. 13, S1501 and S1502 in FIG. 15, or S1507 in FIG. 17. The processing module 1802 may be configured to support the flow control apparatus 1800 in performing S502 and S503 in FIGS. 5, S504 and S505 in FIG. 13, S1503 to S1505 in FIG. 15, or S1506 in FIG. 17. All related content of the operations in the foregoing method embodiments may be cited in function descriptions of corresponding functional modules. Details are not described herein again.

Figure 19:
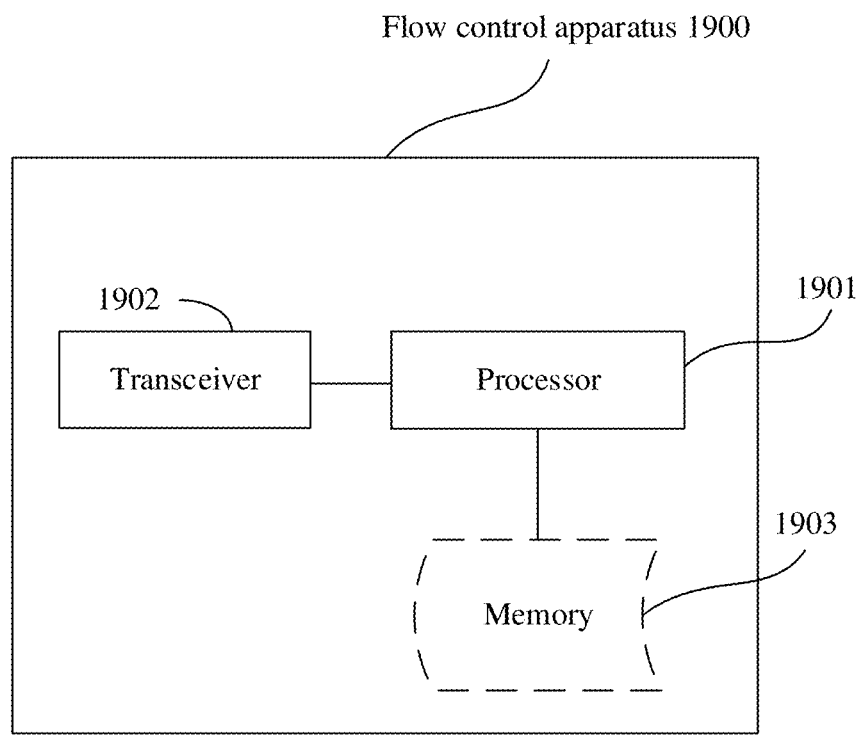
FIG. 19 is a schematic composition diagram of another flow control apparatus according to an embodiment of this application.

When an integrated unit is used, FIG. 19 is a schematic diagram of a possible structure of a flow control apparatus 1900 in the foregoing embodiments. The flow control apparatus 1900 includes a processor 1901 and a transceiver 1902. The processor 1901 is configured to control and manage actions of the flow control apparatus 1900. For example, the processor 1901 is configured to support the flow control apparatus 1900 in performing S502 and S503 in FIG. 5, S502 to S505 in FIG. 13, S1503 to S1505 in FIG. 15, or S1506 in FIG. 17, and/or another process of the technology described in this specification. The transceiver 1902 is configured to support the flow control apparatus 1900 in performing S501 in FIG. 5, S506 in FIGS. 13, S1501 and S1502 in FIG. 15, or S1507 in FIG. 17. In one embodiment, the flow control apparatus 1900 may further include a memory 1903. The memory 1903 is configured to store program code and data that correspond to any flow control method provided above and performed by the flow control apparatus 1900. The memory 1903 may be a read-only memory (read-only memory, ROM), another type of static storage device that can store static information and instructions, a random access memory (random access memory, RAM), or the like.

Method or algorithm operations described in combination with the content disclosed in this application may be implemented by hardware, or may be implemented by a processor executing a software instruction. The software instruction may include a corresponding software module. The software module may be stored in a random access memory (RAM), a flash memory, an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

A person skilled in the art should be aware that in the foregoing one or more examples, functions described in this application may be implemented by hardware, software, firmware, or any combination thereof. When being implemented by software, the functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a general-purpose or dedicated computer.

The objectives, technical solutions, and benefits of this application are further described in detail in the foregoing specific embodiments. It should be understood that the foregoing descriptions are merely specific embodiments of this application, but are not intended to limit the protection scope of this application. Any modification, equivalent replacement or improvement made based on technical solutions of this application shall fall within the protection scope of this application.

What is claimed is:

1. A flow control method, wherein the method comprises:
receiving, by a first device comprising a buffer with eight or more queues for storing packets, a first packet sent by a second device, wherein the first packet carries a first field and a second field, the first field carries a first priority, and the second field carries a second priority;
performing, by the first device, flow control based on the first priority in the first packet; and
performing, by the first device, queue scheduling on the first packet based on the second priority in the first packet.

2. The method according to claim 1, wherein the performing, by the first device, flow control based on the first priority in the first packet comprises:
sending, by the first device, flow control information to the second device based on the first priority in the first packet, wherein the flow control information carries the first priority, and the flow control information is used to indicate the second device to perform flow control based on the flow control information.

3. The method according to claim 2, wherein the flow control information comprises priority-based flow control PFC information, and the PFC information is used to indicate a first port of the second device to perform, based on the first priority, flow control on a packet in a priority queue indicated by the first priority.

4. The method according to claim 3, wherein the PFC information comprises a PFC frame, and the PFC frame is used to indicate the first port of the second device to temporarily stop sending, to the first device, the packet in the priority queue indicated by the first priority.

5. The method according to claim 4, wherein the PFC information comprises a PFC frame, and the PFC frame is used to indicate the first port of the second device to start to send, to the first device, the packet in the priority queue indicated by the first priority.

6. The method according to claim 4, wherein the PFC frame further carries a first duration, and the first duration is used to indicate the first port of the second device to wait for the first duration after receiving the PFC frame, and start to send, to the first device, the packet in the priority queue indicated by the first priority.

7. The method according to claim 2, wherein the flow control information comprises credit-based flow control Credit information, and the Credit information is used to indicate the second device to update, based on a first credit value corresponding to the first priority, a credit value corresponding to a priority queue indicated by the first priority.

8. The method according to claim 1, wherein the method further comprises:
resetting, by the first device, a value of the first priority in the first packet to a value of the second priority in the first packet.

9. The method according to claim 8, wherein the method further comprises:
resetting, by the first device, the value of the second priority in the first packet to a value different from the value of the second priority.

10. The method according to claim 8, wherein the method further comprises:
sending, by the first device, the first packet to a third device.

11. The method according to claim 1, wherein if the first packet is an internet protocol IP data packet, the first field is a precedence field, and the second field is a delay throughput reliability DTR field; or the first field is a delay throughput reliability DTR field, and the second field is a precedence field.

12. The method according to claim 1, wherein if the first packet is an Ethernet data packet, the first field is a priority PRI field in a first virtual local area network tag VLAN tag, and the second field is a priority PRI field in a second virtual local area network tag VLAN tag.

13. A flow control method, wherein the method comprises:
receiving, by a first device comprising a buffer with eight or more queues for storing packets, a first packet sent by a second device, wherein the first packet carries a first field, and the first field carries a first priority;
receiving, by the first device, a mapping table sent by a controller, wherein the mapping table comprises a correspondence between identification information of a packet and a second priority;
looking up, by the first device, the mapping table to determine a second priority corresponding to the first packet;
performing, by the first device, flow control based on the first priority in the first packet; and
performing, by the first device, queue scheduling on the first packet based on the second priority corresponding to the first packet.

14. The method according to claim 13, wherein the performing, by the first device, flow control based on the first priority in the first packet comprises:
sending, by the first device, flow control information to the second device based on the first priority in the first packet, wherein the flow control information carries the first priority, and the flow control information is used to indicate the second device to perform flow control based on the flow control information.

15. The method according to claim 14, wherein the flow control information comprises priority-based flow control PFC information, and the PFC information is used to indicate a first port of the second device to perform, based on the first priority, flow control on a packet in a priority queue indicated by the first priority.

16. The method according to claim 15, wherein the PFC information comprises a PFC frame, and the PFC frame is used to indicate the first port of the second device to temporarily stop sending, to the first device, the packet in the priority queue indicated by the first priority.

17. A flow control apparatus, wherein the apparatus comprises:
- a transceiver module, configured to receive a first packet sent by a second device, wherein the first packet carries a first field and a second field, the first field carries a first priority, and the second field carries a second priority;
- a buffer comprising eight or more queues for storing packets; and
- a processing module, configured to perform flow control based on the first priority in the first packet; wherein
- the processing module is further configured to perform queue scheduling on the first packet based on the second priority in the first packet.

18. The apparatus according to claim 17, wherein
the processing module is specifically configured to send flow control information to the second device based on the first priority in the first packet through the transceiver module, wherein the flow control information carries the first priority, and the flow control information is used to indicate the second device to perform flow control based on the flow control information.

19. The apparatus according to claim 18, wherein the flow control information comprises priority-based flow control PFC information, and the PFC information is used to indicate a first port of the second device to perform, based on the first priority, flow control on a packet in a priority queue indicated by the first priority.

20. The apparatus according to claim 19, wherein the PFC information comprises a PFC frame, and the PFC frame is used to indicate the first port of the second device to temporarily stop sending, to the transceiver module, the packet in the priority queue indicated by the first priority.

* * * * *